(12) United States Patent
Kondo et al.

(10) Patent No.: US 6,934,414 B2
(45) Date of Patent: Aug. 23, 2005

(54) IMAGE PROCESSING APPARATUS, IMAGE PROCESSING METHOD, AND RECORDING MEDIUM

(75) Inventors: Tetsujiro Kondo, Tokyo (JP); Hisakazu Shiraki, Kanagawa (JP); Hideo Nakaya, Kanagawa (JP); Yuji Okumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 09/950,019

(22) Filed: Sep. 10, 2001

(65) Prior Publication Data

US 2002/0076106 A1 Jun. 20, 2002

(30) Foreign Application Priority Data

Sep. 11, 2000 (JP) ........................................ 2000-274766

(51) Int. Cl.[7] ................................................ G06K 9/48
(52) U.S. Cl. ...................................... 382/199; 382/194
(58) Field of Search ................................ 382/103, 181, 382/190, 194, 199, 305, 309–311; 358/403; 707/6–10

(56) References Cited

U.S. PATENT DOCUMENTS

| 5,019,975 | A | * | 5/1991 | Mukai ............................ 707/7 |
| 6,021,221 | A | * | 2/2000 | Takaha ......................... 382/199 |
| 6,217,520 | B1 | * | 4/2001 | He et al. ...................... 600/467 |
| 6,470,151 | B1 | * | 10/2002 | Ohsawa ....................... 396/311 |
| 6,473,198 | B1 | * | 10/2002 | Matama ....................... 358/1.9 |
| 6,674,902 | B1 | * | 1/2004 | Kondo et al. ............... 382/199 |
| 6,690,825 | B1 | * | 2/2004 | Nakayama ................... 382/190 |

* cited by examiner

*Primary Examiner*—Daniel Miriam
(74) *Attorney, Agent, or Firm*—Frommer Lawrence & Haug LLP; William S. Frommer; Thomas F. Presson

(57) ABSTRACT

An image processing apparatus includes an object extracting unit, a selecting unit, and an object storing unit. The object extracting unit extracts an object from a target image through a plurality of processing, and outputs the result of extracting the object. The selecting unit selects at least a part of the result of extracting the object which is obtained through the plurality of processing, in accordance with a user's operation. The object storing means stores the result of extracting the object which is selected by the selecting unit.

29 Claims, 23 Drawing Sheets

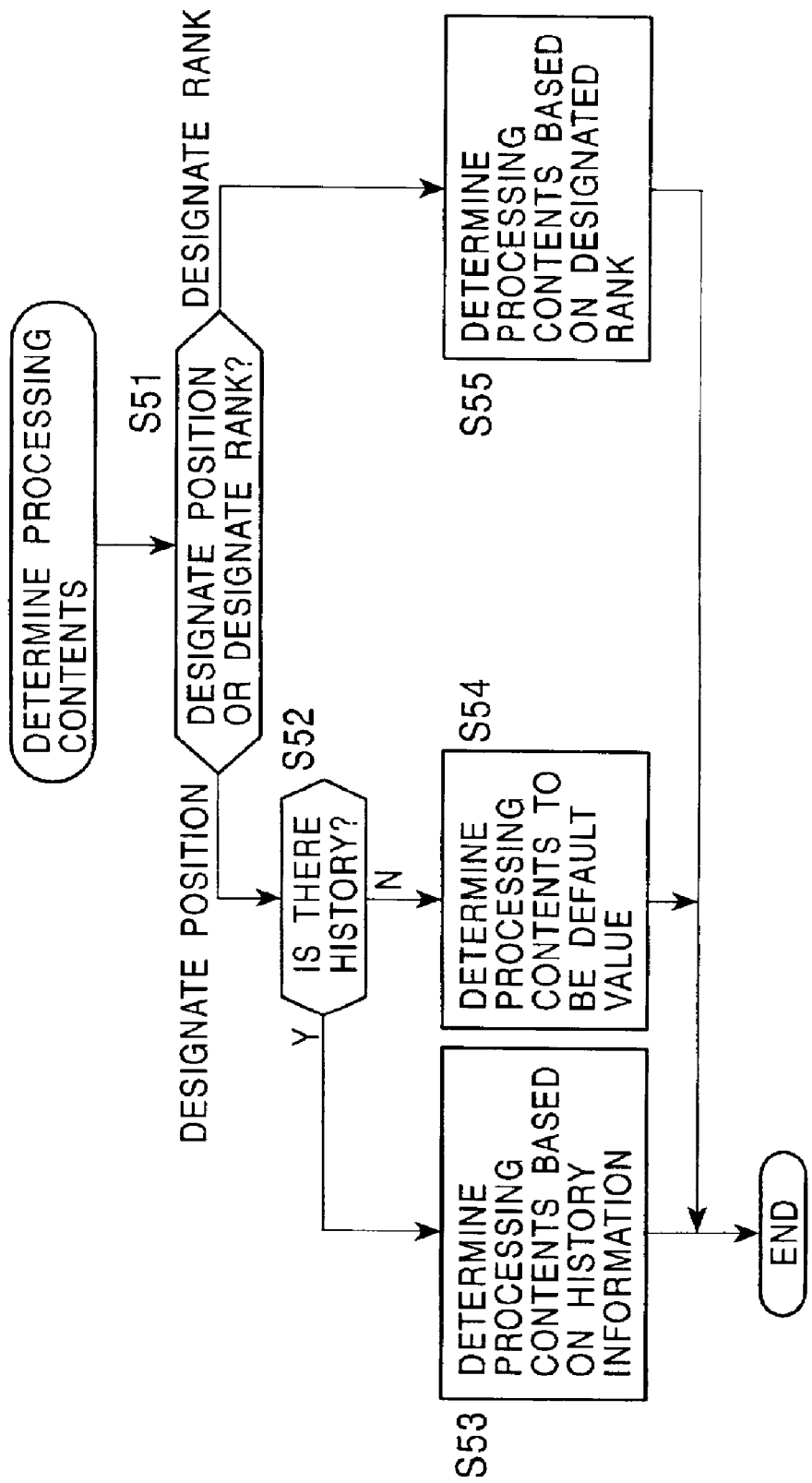

FIG. 18A

DETERMINE PROCESSING CONTENTS BASED ON HISTORY INFORMATION
↓
S61: DETECT BOUNDARY ON SAME PLANE AS BEFORE-FRAME
↓
S62: TH2 ← THRESHOLD USED FOR BEFORE-FRAME
↓
S63: TH1 ← TH2−20
TH3 ← TH2+20
↓
END

FIG. 18B

DETERMINE PROCESSING CONTENTS TO BE DEFAULT VALUE
↓
S71: V-COMPONENT OF PIXEL AT DESIGNATED POSITION < 50 ?
- Y → S72: DETECT BOUNDARY ON V-PLANE → S73: TH1 ← 40, TH2 ← 100, TH3 ← 180 → END
- N → S74: DETECT BOUNDARIES ON H-, S-, AND V-PLANES → S75: TH_H ← 100, TH_S ← 100, TH_V ← 100 → END

FIG. 18C

DETERMINE PROCESSING CONTENTS BASED ON DESIGNATED RANK
↓
S81: RANK OF PLANE OR RANK OF THRESHOLD?
- PLANE → S82: DETECT BOUNDARY ON 1ST PLANE → S83: TH1 ← 40, TH2 ← 100, TH3 ← 180 → END
- THRESHOLD → S84: DETECT BOUNDARY ON SAME PLANE AS THAT AT PREVIOUS TIME → S85: TH1 ← 1ST, TH2 ← (1ST + 2ND)/2, TH3 ← 2ND → END

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus, an image processing method, and a recording medium, more particularly, to an image processing apparatus, an image processing apparatus, and a recording medium which are capable of correctly extracting an object with easy operation.

2. Description of the Related Art

Various methods for extracting objects as materials in a foreground, etc. from images are proposed.

According to a method as disclosed in Japanese Unexamined Patent Application Publication No. 10-269369, an object is extracted based on detected results derived from iterating such operations that the contour of the object in one frame is detected and then the contour of the object in another frame is detected by searching for the periphery of the object in the one frame.

Further, there are methods for searching for pixels having pixel values around any desired pixel value and for extracting an area having the pixels as an object, etc.

However, if the contour of the object is detected from a target frame by searching for only the periphery of the object in a frame just before the target frame, there is a problem to make it impossible that when the object is greatly deformed or moved, the contour of the object is erroneously detected with high probability and the object cannot be correctly extracted.

When a user designates the contour of the object every frame and then the object is extracted based on the designated contour, it is troublesome for the user to increase the load of operation.

Further, according to the conventional object extracting method using the pixel value, an apparatus extracts the object based on a predetermined threshold as one parameter and other parameters. Although the object can be preferably extracted from an image having one feature, the object cannot be preferably extracted from an image having other features.

Furthermore, a method for setting variable parameters used in the object extraction is considered. Although, in this case, the object can be preferably extracted from one portion which matches one set parameter, the object cannot be preferably extracted from another portion which does not match the one set parameter. Consequently, the overall of the object cannot be correctly extracted.

SUMMARY OF THE INVENTION

The present invention is devised under the above-mentioned circumferences. It is an object of the present invention to enable an object to be correctly extracted with easy operation.

According to a first aspect of the present invention, an image processing apparatus comprises: determining means for determining the contents of processing for extracting an object from a target frame based on a user's input and a processing history, as the contents of processing used for extracting the object from a frame processed before the target frame; and object extracting means for extracting the object from the target image through the processing determined by the determining means.

According to a second aspect of the present invention, an image processing method comprises the steps of: determining the contents of processing for extracting an object from a target frame based on a user's input and a processing history, as the contents of processing used for extracting the object from a frame processed before the target frame; and extracting the object from the target image through the processing determined by the determining step.

According to a third aspect of the present invention, a storage medium stores therein a program which comprises the steps of: determining the contents of processing for extracting an object from a target frame based on a user's input and a processing history, as the contents of processing used for extracting the object from a frame processed before the target frame; and extracting the object from the target image through the processing determined in the determining step.

According to a fourth aspect of the present invention, in an image processing apparatus, an image processing method, and a storage medium, the contents of processing for extracting an object from a target frame are determined based on a user's input and a processing history, as the contents of processing used for extracting the object from a frame processed before the target frame, and the object is extracted from the target image through the processing determined.

Accordingly, the object can be correctly extracted with easy operation.

According to a fifth aspect of the present invention, an image processing apparatus comprises: object extracting means for extracting an object from an image of a target frame through a plurality of processing; selecting means for selecting one of results of extracting the object through the plurality of processing, to be reflected to a final one, based on a user's input; and reflecting means for reflecting the result of extracting the object selected by the selecting means to the final result of extracting the object.

According to a sixth aspect of the present invention, an image processing method comprises the steps of: extracting an object from an image of a target frame through a plurality of processing; selecting one of results of extracting the object through the plurality of processing, to be reflected to a final one, based on a user's input; and reflecting the result of extracting the object selected in the selecting step to the final result of extracting the object.

According to a seventh aspect of the present invention, a storage medium stores therein a program which comprises the steps of: extracting an object from an image of a target frame through a plurality of processing; selecting one of results of extracting the object through the plurality of processing, to be reflected to a final one, based on a user's input; and reflecting the result of extracting the object selected in the selecting step to the final result of extracting the object.

According to an eighth aspect of the present invention, in an image processing apparatus, an image processing method, and a storage medium, an object is extracted from an image of a target frame through a plurality of processing, one of results of extracting the object through the plurality of processing result to be reflected to a final result is selected based on a user's input, and the selected result of extracting the object is reflected to the final result of extracting the object.

Accordingly, the object can be correctly extracted with easy operation.

BRIEF DESCRIPTION OF THE DRAWINGS

FIGS. 10A and 10B are diagrams for explaining thin-line processing, in which FIG. 10A is a flowchart for the thin-line processing and FIG. 10B is a diagram showing a target pixel and pixels around it used for the thin-line processing in FIG. 10A;

FIG. 17 is a flowchart for explaining processing of a processing control unit 7;

FIGS. 18A to 18C are flowcharts for explaining in detail processing in steps S53 to S55 in FIG. 17;

DESCRIPTION OF THE PREFERRED EMBODIMENTS

Figure 1:
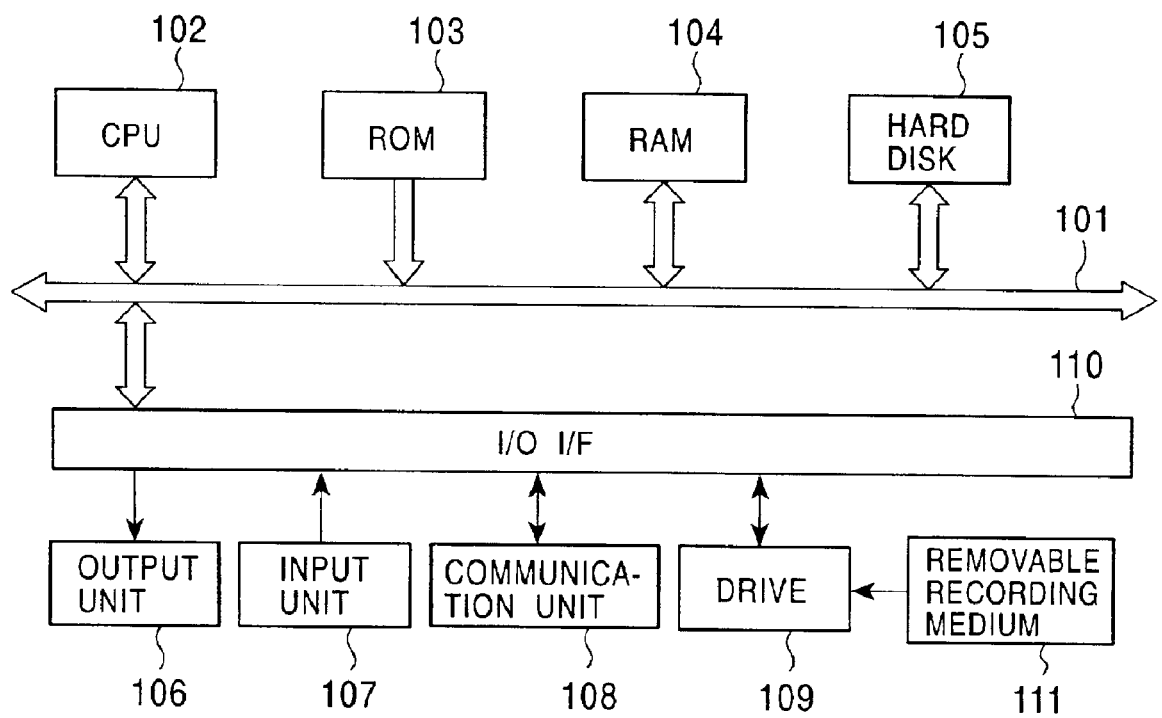
FIG. 1 is a block diagram showing the structure of hardware in an image processing apparatus according to an embodiment of the present invention.

FIG. 1 shows an example of the structure of hardware in an image processing apparatus according to an embodiment of the present invention.

The image processing apparatus is a computer which installs therein a program for a series of processing to extract an object (hereinafter, referred to as an object extracting processing program when necessary), which will be described later.

Incidentally, in the image processing apparatus, the computer executes the object extracting program. Further, the image processing apparatus can be constructed by hardware dedicated therefor.

The object extracting processing program is pre-recorded to a hard disk 105 or a ROM 103 as a recording medium integrated in the computer.

Alternatively, the object extracting processing program is temporarily or persistently stored (recorded) to a removable recording medium 111 such as a floppy disk, a CD-ROM (Compact Disc Read-Only Memory), an MO (Magneto optical) disc, a DVD (Digital Versatile Disc), a magnetic disk, or a semiconductor memory. The removable recording medium 111 can be provided as package software.

In addition to being installed in the computer from the removable medium 111, the object extracting processing program can be transferred to the computer from a download site by radio via a satellite for digital satellite broadcasting, or be transferred to the computer via a network, e.g. a LAN (Local Area Network) or the Internet through cable. In the computer, a communication unit 108 receives the object extracting processing program thus transferred, and installs it to the hard disk 105 integrated therein.

The computer integrates a CPU (Central Processing Unit) 102. An input/output interface (I/F) 110 is connected to the CPU 102 via a bus 101. The CPU 102 executes the object extracting processing program stored in the ROM 103 in accordance with an instruction which is inputted by a user through an input unit 107 having a keyboard, a mouse, a microphone, etc. Alternatively, the CPU 102 executes the object extracting processing program by loading, to a RAM (Random Access Memory) 104, the object extracting processing program which is stored in the hard disk 105, the object extracting processing program which is transferred from the satellite or the network, is received to the communication unit 108, and is installed in the hard disk 105, or the object extracting processing program which is read by the removable recording medium 111 mounted on the drive 109 and is installed in the hard disk 105. Thus, the CPU 102 performs processing on a flowchart, which will be described later, or processing in the structure of a block diagram, which will be described later. When necessary, via the input/output I/F 110, the CPU 102 outputs the processing result from an output unit 106 comprising an LCD (Liquid Crystal Display), a speaker, etc. or transmits it from the communication unit 108 and records it to the hard disk 105.

In the present invention, the processing routine for describing the program for allowing the computer to execute various processing may not be necessarily performed on time series along the flowchart, and may include processing which is executed in parallel or individually, e.g., parallel processing or processing using the object.

The program may be processed by the single computer or be processed distributionally by a plurality of computers. Moreover, the program may be transferred to a remote computer and be executed.

Figure 2:
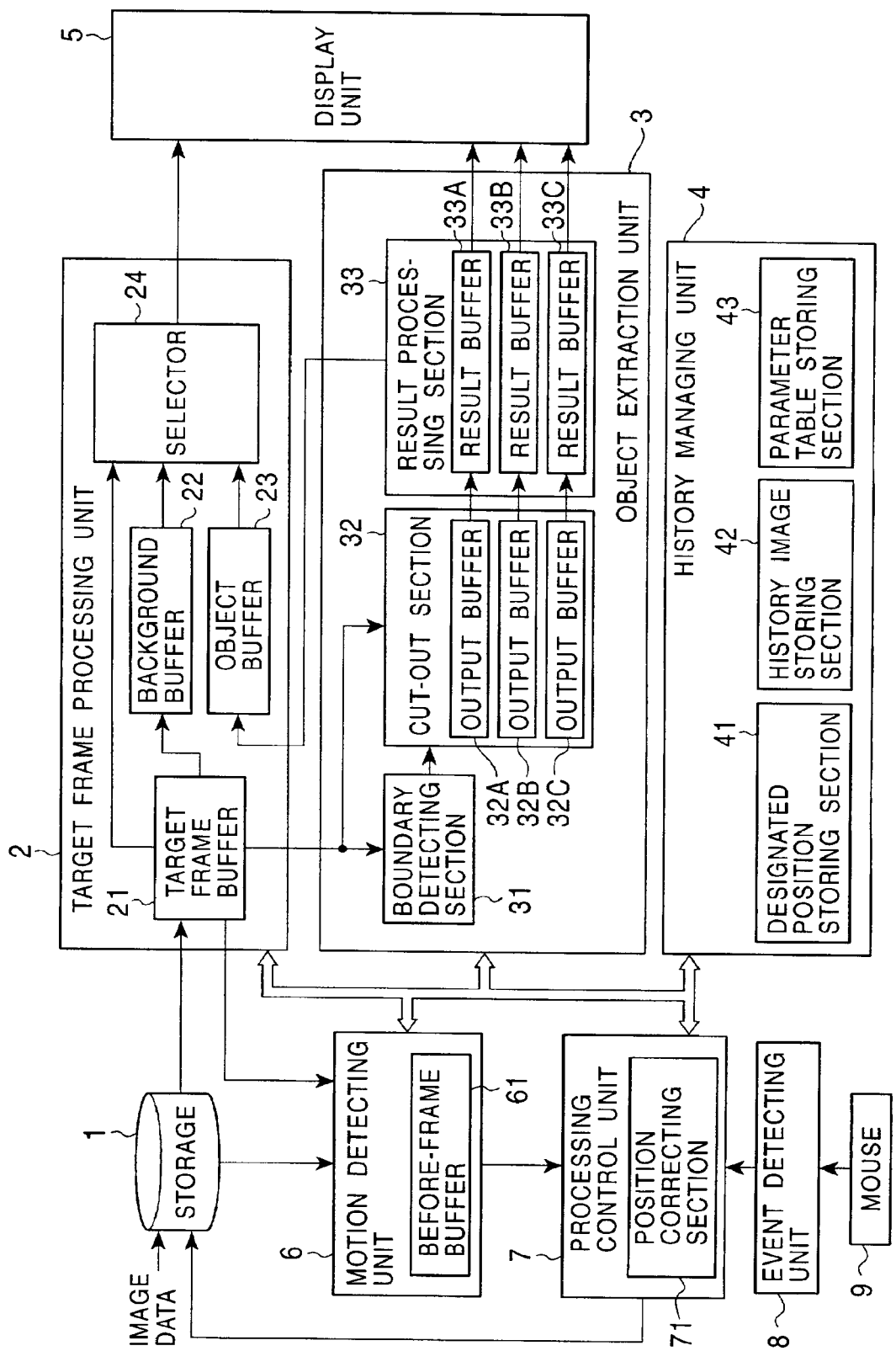
FIG. 2 is a block diagram showing an example of the structure of functions of the image processing apparatus in FIG. 1.

FIG. 2 shows an example of the structure of functions of the image processing apparatus in FIG. 1. The CPU 102 in FIG. 1 executes the object extracting processing, thereby implementing the structure of the functions.

A storage 1 stores moving picture data from which the object is extracted, and also stores history information of frames, etc. to be supplied from a processing control unit 7, which will be described later.

A target frame processing unit 2 reads image data of a target frame serving as a predetermined frame of the image data stored in the storage 1, and performs processing on the target frame under the control of the processing control unit 7.

In other words, the target frame processing unit 2 comprises a target frame buffer 21, a background buffer 22, an object buffer 23, a selector 24, and the like. The target frame buffer 21 stores image data of the target frame which is read from the storage 1. The target frame buffer 21 stores the image data of the target frame, which is read from the storage 1. The background buffer 22 stores the remaining image data, as a background image, other than the stored portion in the object buffer 23, which will be described later, out of the image data of the target frame stored in the target frame buffer 21. The object buffer 23 stores the object of the target frame which is extracted by the object extracting unit 3, which will be described later. The selector 24 selects any of the target frame stored in the target frame buffer 21, the background image stored in the background buffer 22, and the object stored in the object buffer 23, and supplies the selected data to a display unit 5.

The object extracting unit 3 extracts the object from the target frame stored in the target frame buffer 21 under the control of the processing control unit 7 through a plurality of processing.

That is, the object extracting unit 3 comprises a boundary detecting section 31, a cut-out section 32, a result processing section 33, etc. The boundary detecting section 31 detects a boundary portion of the target frame image which is stored in the target frame buffer 21, and generates a plurality of types (herein, e.g., three types) of boundary images which are formed of binary data indicating the boundary portion and a portion excluding the boundary portion (hereinafter, when necessary, referred to as a non-boundary portion). The cur-out section 32 refers to the three boundary images which are generated by the boundary detecting section 31, and cuts out an object area from the target frame which is stored in the target frame buffer 21. Further, the cut-out section 32 comprises three output buffers 32A to 32C for storing therein the areas which are cut out by referring to the three boundary images. The result processing section 33 comprises three result buffers 33A to 33C corresponding to the three output buffers 32A to 32C, and combines storage contents of the output buffers 32A to 32C to the extracted results of the object, which are stored in the object buffer 23, and stores the three combined results to the result buffers 33A to 33C. Further, the result processing section 33 selects one of the storage contents of the result buffers 33A to 33C based on an input supplied by the user's operation of the mouse 9, and reflects the selected storage contents to the storage contents of the object buffer 23.

The history managing unit 4 manages the history information under the control of the processing control unit 7.

In other words, the history managing unit 4 comprises a designated position managing section 41, a history image storing section 42, a parameter table storing section 43, etc. The designated position storing section 41 stores the history of position coordinates on the target frame, which is inputted by the user's operation of the mouse 9. The history image storing section 42 stores a history image indicating the history of processing contents of the object extracting unit 3. The parameter table storing section 43 stores parameters indicating the processing contents of the object extracting unit 3, corresponding to an ID as the pixel value forming the history image. In other words, the parameter table storing section 43 stores the parameters indicating the processing contents of the object extracting unit 3, corresponding to the unique ID. The history image storing section 42 stores, every pixel forming the object, the ID corresponding to the processing contents used for extraction of the pixels forming the object. Consequently, the processing contents used for extracting the pixels forming the object, as the object, can be recognized by referring to the parameters stored in the parameter table storing section 43, corresponding to the ID as the pixel value of the history image of the pixels.

The history image storing section 42 stores the image comprising the pixel values, while setting, to be the pixel value, the ID corresponding to the parameter indicating the processing contents when the pixels are extracted as the object. Therefore, the image indicates the history of the processing contents used for the extraction of the object and is referred to as the history image. When necessary, the history information means all of the storage contents of the designated position storing section 41, the history image storing section 42, and the parameter table storing section 43.

The designated position storing section 41, the history image storing section 42, and the parameter table storing section 43 have at least two banks, respectively. By switching the banks, the history information on the target frame and a frame just therebefore by one frame (before-frame) can be stored.

The display unit 5 displays both the image outputted by the selector 24, that is, the target-frame image, the background image, or the object image, and the image stored in the result buffers 33A to 33C in the result processing section 33.

The motion detecting unit 6 detects a motion vector which is based on the image of the before-frame which is before the target frame, under the control of the processing control unit 7, and supplies the detected motion vector to the processing control unit 7.

The motion detecting unit 6 integrates a before-frame buffer 61, reads the image data of the before-frame from the storage 1, and stored the read image data in the before-frame buffer 61. The motion detecting unit 6 performs motion detecting processing (such as block matching) for the image data of the before-frame, which is stored in the before-frame buffer 61 and for the image data of the target frame, which is stored in the target frame buffer 21 in the target frame processing unit 2, thereby detecting the motion vector and supplying it to the processing control unit 7.

The processing control unit 7 controls the target frame processing unit 2, the object extracting unit 3, the history managing unit 4, and the motion detecting unit 6 based on event information supplied from an event detecting unit 8. Further, the processing control unit 7 determines the processing contents of the object extracting unit 3 based on the event information supplied from the event detecting unit 8 and the history information managed by the history managing unit 4, and allows the object extracting unit 4 to extract the object based on the determined result. The processing control unit 7 integrates a position correcting section 71 for correcting position information on the target frame image, which is supplied from the event detecting unit 8 as event information, and position information stored in the designated position storing section 41 of the history managing unit 4, in accordance with the motion vector from the motion detecting unit 6. The corrected position information is supplied to the object extracting unit 3, which will be described later, and is used for the extraction of the object, alternatively, it is supplied to the history managing unit 4 and is stored in the designated position storing section 41.

The event detecting unit 8 detects an event which is generated by the user's operation of the mouse 9, and supplies the event information indicating the event contents to the processing control unit 7.

The mouse 9 is operated by the user when the position on the image displayed on the display unit 5 is designated or when a predetermined command is supplied to the apparatus.

Figure 3:
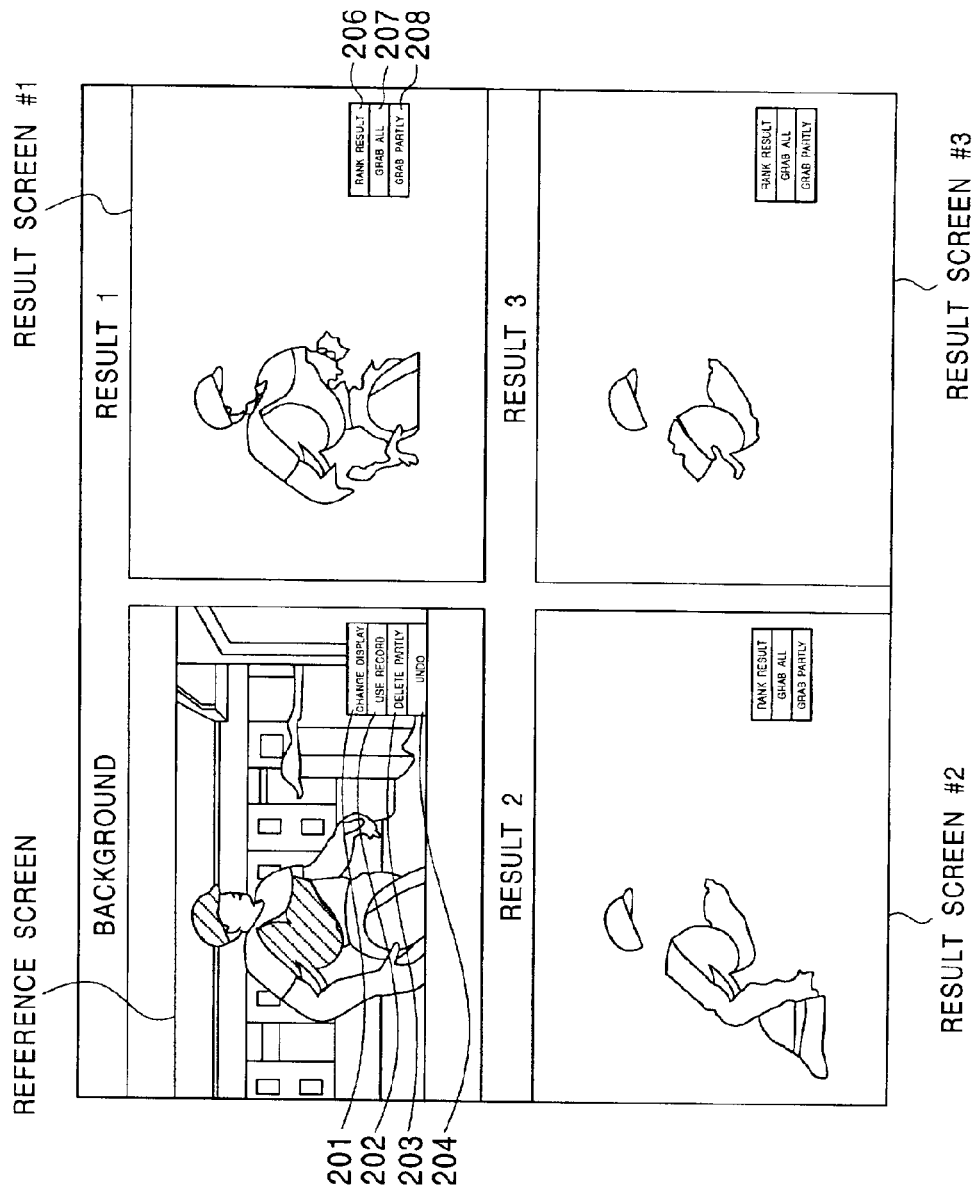
FIG. 3 is a diagram showing a display example of a screen of a display unit 5.

FIG. 3 shows a display example of the screen of the display unit 5.

When the object extracting processing program is executed, the display unit 5 displays thereon a window which is divided to two sections in the respective horizontal and vertical directions as shown in FIG. 3.

On the four-divided window, the screen on the upper left is a reference screen, those on the upper right, the lower left, and the lower right are result screens #1, #2, and #3, respectively.

An image outputted by the selector 24 is displayed on the reference screen. As mentioned above, the selector 24 selects one of the target frame stored in the target frame buffer 21, the background image stored in the background buffer 22, and the object stored in the object buffer 23, and then supplies the selected image to the display unit 5, thus displaying one of the target-frame image (original image), the object, and the background image on the reference screen. The user's operation of the mouse 9 enables the switching of the original image, the object, and the background image which are displayed on the display unit 5. According to the embodiment, as shown in FIG. 3, the reference screen displays thereon the background image stored in the background buffer 22, that is, the image obtained excluding the image fetched to the object buffer 23, as the object, out of the original image. Hatched portions on the reference screen indicate the image fetched to the object buffer 23 at the present (hereinlater, this is similarly applied to the following drawings).

A change display button 201, a use record button 202, a delete partly button 203, and an undo button 204 are provided on the lower right of the reference screen.

The user operates the change display button 201 when switching the image to be displayed on the reference screen. More specifically, the selector 24 sequentially selects the outputs of the target frame buffer 21, the background buffer 22, and the object buffer 23 each time clicking the change display button 201 by using the mouse 9. Consequently, the image displayed on the reference screen is sequentially switched to the original image, the object, and the background image.

The user operates the use record button 202 when it is determined whether or not the history information stored in the history managing unit 4 is used to extract the object from the target frame stored in the target frame buffer 21. More specifically, the use record button 202 is clicked by the mouse 9 and, then, a pull down menu for setting the allowance of use of the history information is displayed on the reference screen. Incidentally, according to the embodiment, it is assumed that the use of the history information is fundamentally permitted.

The user operates the delete partly button 203 when a part of the image stored in the object buffer 23 as the object is deleted (the screen is returned to the background image from the object image). More specifically, the user operates the mouse 9 so that a predetermined range of the object displayed on the reference screen is designated, thereafter, the delete partly button 203 is clicked by using the mouse 9, and the predetermined range of the object is deleted from the object buffer 23. The delete partly button 203 is used when a part of the background is fetched to the object buffer 23 as the object and then the background is deleted from the object.

The user operates the undo button 204 when a part of the image fetched to the object buffer 23 as the object at the previous time is deleted out of the result buffers 33A to 33C in the result processing section 33. In other words, the operation of the undo button 204 enables the image stored in the object buffer 23 to return to the image status just before fetching the image out of the result buffers 33A to 33C. The object buffer 23 has a plurality of banks for holding at least the image status just before fetching the image out of the result buffers 33A to 33C. When the undo button 204 is operated, the object buffer 23 switches the bank to the bank which is proximately selected, thereby switching the image outputted to the selector 24.

The result screens #1 to #3 display thereon the storage contents of the result buffers 33A to 33C in which the objects extracted from the target frame in different processing are stored, that is, the results of extracting the object in the three different processing. On the lower right of the result screens #1 to #3, a rank result button 206, a grab all button 207, and grab partly button 208 are arranged.

The user operates the rank result button 206 when the results of extracting the object displayed on the result screens #1 to #3 are ranked. More specifically, the user operates the mouse 9 so that the rank result button 206 of each of the result screens #1 to #3 is clicked in order of the preferable results of extracting the object and then the results of extracting the object, which are displayed on the result screens #1 to #3, are ranked in the click order. The object extracting unit 3 extracts the object based on the ranking again, and the results of extracting the object are displayed on the result screens #1 to #3.

The user operates the grab all button 207 when any of the results of extracting the object, displayed on the result screens #1 to #3, is reflected (fetched) to the object buffer 23. More specifically, the user operates the mouse 9 so that while the preferable result of extracting the object is displayed out of the extracted results of the result screens #1 to #3, the grab all button 207 is clicked and then all of the storage contents of the result buffer for storing the result of extracting the object, which is displayed on the result screen, are selected, thus reflecting the storage contents to the object buffer 23.

The user operates the grab partly button 208 when a part of the results of extracting the object displayed on the result screens #1 to #3 is reflected (extracted) to the object buffer 23. More specifically, the user operates the mouse 9 so that a part of the preferable result of extracting the object is designated out of the result screens #1 to #3, thereafter, the grab partly button 208 is clicked by the mouse 9, and then a part of the designated result of extracting the object is selected, thus reflecting the selected image to the object buffer 23.

The outline of the processing of the image processing apparatus in FIG. 2 will be described with reference to the flowchart of FIG. 4.

An event is caused by the user's operation of the mouse 9. Then, in step S1, the event detecting unit 8 determines the contents of the event.

When it is determined in step S1 that the event indicates an instruction of "select screen" for switching the image displayed on the reference screen of the display unit 5, that is, when the change display button 201 in FIG. 3 is clicked, the event detecting unit 8 supplies event information indicating the "select screen" to the processing control unit 7. When the processing control unit 7 receives the event information indicating the "select screen", the processing routine advances to step S2 whereupon it controls the selector 24 in the target frame processing unit 2, and then the processing routine ends.

Consequently, the selector 24 switches the outputs of the target frame buffer 21, the background buffer 22, and the object buffer 23. As the switched result, the image displayed on the reference screen is switched to any of the original image of the target frame, which is stored in the target frame buffer 21, the background image stored in the background buffer 22, and the object stored in the object buffer 23.

It is determined in step S1 that the event indicates "undo" for deleting the image which is proximately reflected (stored) in the object buffer 23, the event detecting unit 8 supplies event information indicating the "undo" to the processing control unit 7. The processing control unit 7 receives the event information indicating the "undo", and then, in step S3, it controls the object buffer 23 in the target frame processing unit 2 so that at least a part of the object which is proximately reflected (stored) in the object buffer 23 is deleted. After that, the processing routine advances to step S4.

In step S4, the processing control unit 7 deletes the history information on the image deleted from the object buffer 23 in step S3 by controlling the history managing unit 4 and, then, the processing routine ends.

In other words, when the image as the object is reflected (stored) in the object buffer 23, as will be described later, the history information on the reflected image, managed by the history managing unit 4, is updated. When the image is deleted from the object buffer 23, the history information on the deleted image is deleted.

On the contrary, when it is determined in step S1 that the event indicates an instruction of "delete partly" for partly deleting the image reflected to the object buffer 23, that is, when a predetermined range is designated and further the delete partly button 203 is clicked, the event detecting unit 8 supplies event information indicating "delete partly" to the processing control unit 7. The processing control unit 7 receives the event information indicating the "delete partly" and then, in step S5, it controls the object buffer 23 in the target frame processing unit 2 so that the designated range is deleted out of the image stored in the object buffer 23 as the object. After that, the processing routine step S4.

In step S4, the processing control unit 7 deletes the history information on the image deleted out of the object buffer 23 in step S5 by controlling the history managing unit 4. Then, the processing routine ends.

Figure 6:
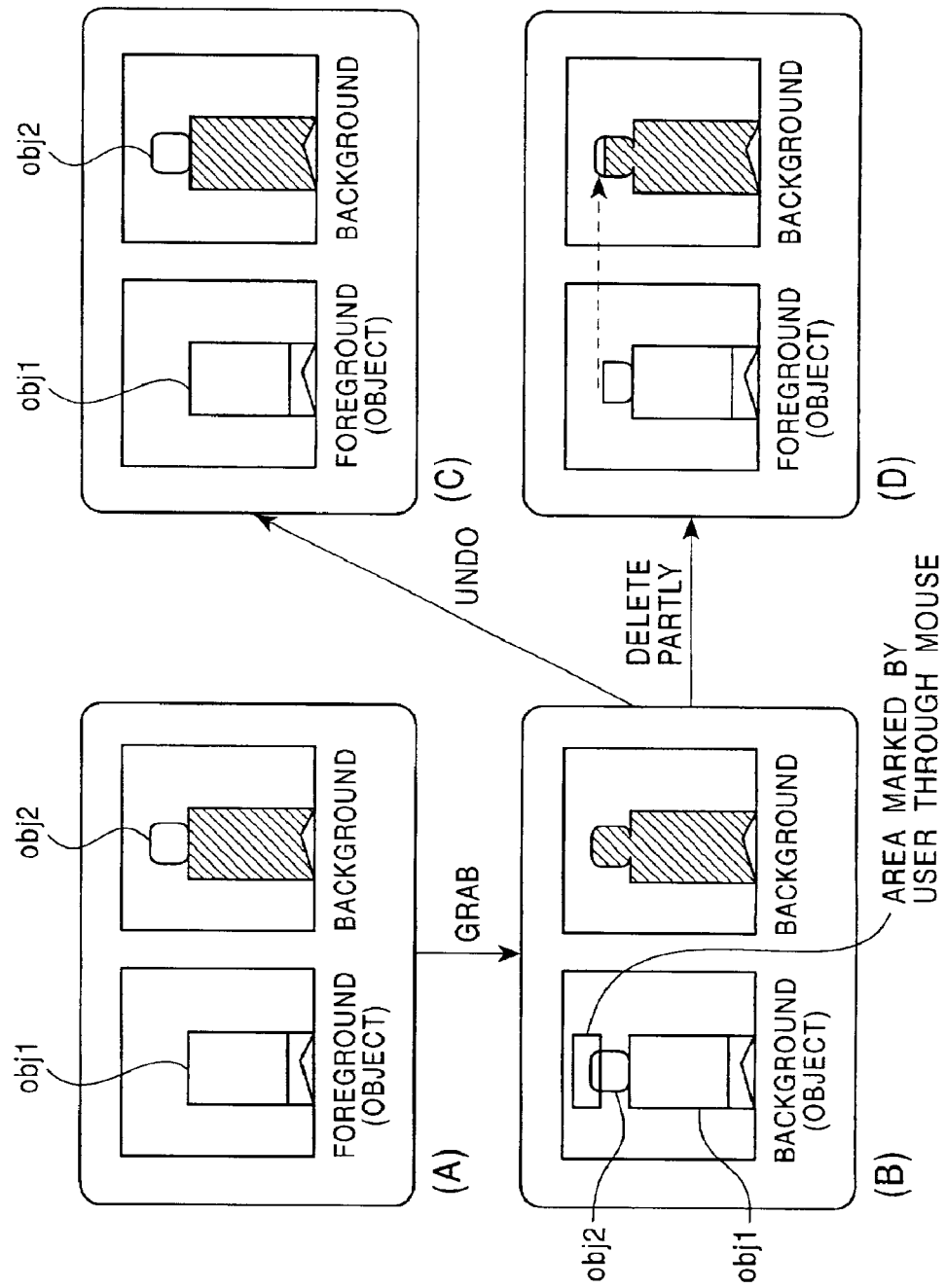
FIG. 6 is a diagram for explaining "undo", and "delete partly"

Consequently, as shown in an image example (A) in FIG. 6, when an object obj1 indicating the human's body is stored in the object buffer 23 and an object obj2 indicating the human's head and the background such as a landscape are stored in the background buffer 22, the object extracting unit 3 extracts the object obj2 indicating the head and the extracted head is reflected to the object buffer 23. Then, as shown in an image example (B) in FIG. 6, the storage contents of the object buffer 23 become the objects obj1 and obj2 and the storage contents of the background buffer 22 become only the background such as the landscape.

If the user clicks the undo button 204 by using the mouse 9, as shown in an image example (C) in FIG. 6, the storage contents of the object buffer 23 return to an image status in which only the object obj1 before reflecting the object obj2 indicating the head is stored. Also, in this case, the storage contents of the background buffer 22 return to an image status in which the background such as the landscape and the object obj2 indicating the head are stored. In other words, the storage contents return to the status shown in the image example (A) in FIG. 6.

The object obj2 indicating the head is partly designated by the user's operation of the mouse 9, as shown in the image example (B) in FIG. 6. Further, as shown in an image example (D) in FIG. 6, by the user's click of the delete partly button 203, the storage contents of the object buffer 23 is in an image status in which the designated range is deleted out of the object obj2 and the storage contents of the background buffer 22 is in an image status in which the designated range is added to the background such as the landscape.

Figure 7:
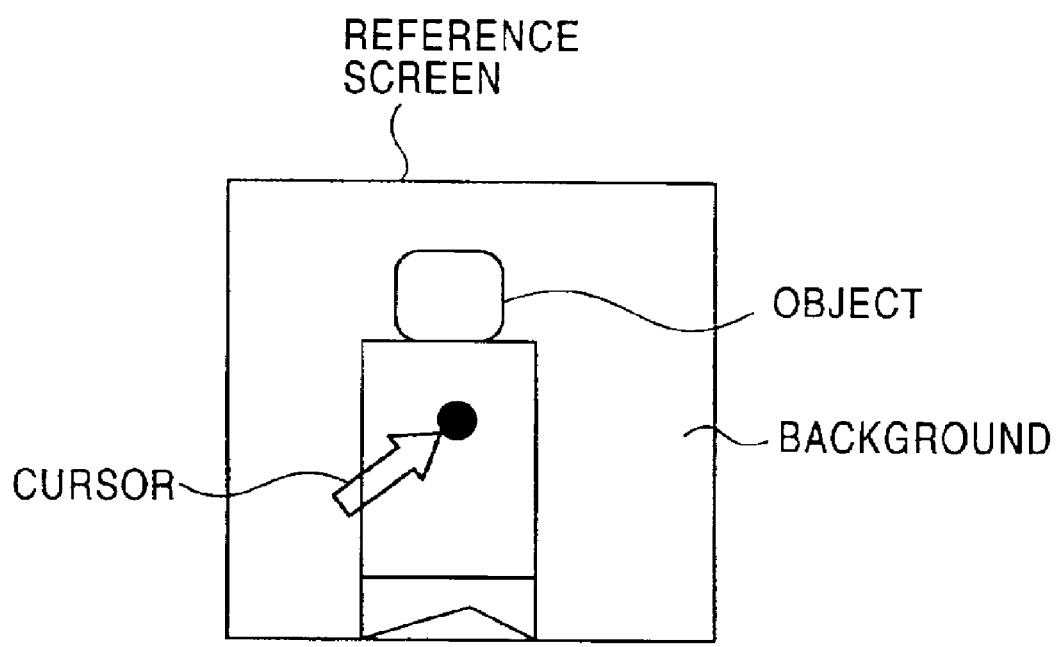
FIG. 7 is a diagram showing a status in which a user designates a point on an object.

When it is determined in step S1 that the event indicates "designate position" for designating the position on the image displayed on any of the reference screen and the result screens #1 to #3, that is, as shown in FIG. 7, when the position of the object in the original image or the background image displayed on the reference screen is clicked by the user's operation of the mouse 9, the event detecting unit 8 supplies event information indicating the "designate position" to the processing control unit 7. The processing control unit 7 receives the event information indicating the "designate position" and then, in step S6, it controls the object extracting unit 3 so that the contents of the three object extracting processing which are performed by the object extracting unit 3 are determined based on the position clicked by the mouse 9, etc. and the object is extracted in the three object extracting processing.

Consequently, in step S7, the object extracting unit 3 executes the three object extracting processing and, thus, stores the three results of extracting the object in the result buffers 33A to 33C in the result processing section 33.

In step S8, the display unit 5 displays the results of extracting the object, which are stored in the result buffers 33A to 33C, on the result screens #1 to #3. Then, the processing routine ends.

When it is determined in step S1 that the event indicates "designate rank" for designating the rank of the preferable results of extracting the object, which are displayed on the result screens #1 to #3, that is, when the rank result buttons 206 displayed on the result screens #1 to #3 are clicked in predetermined order, the event detecting unit 8 supplies event information indicating the "designate rank" to the processing control unit 7. The processing control unit 7 receives the event information indicating the "designate rank" and then, in step S6, it controls the object extracting unit 3 so that the contents of the three object extracting processing to be executed by the object extracting unit 3 are determined based on the rank designated by the "designate rank" and the object is extracted in the three object extracting processing. The processing routine advances to steps S7 and S8, and the processing similar to that in the above description is performed.

When it is determined in step S1 that the event indicates "grab all" and "grab partly" for reflecting, to the object buffer 23, all or a part of the selected one of the results of extracting the object which are displayed on the result screens #1 to #3, that is, when the grab all button 207 of any of the result screens #1 to #3 is clicked or a part of one of the results of extracting the object which are displayed on the result screens 1 to 3 is designated and the grab partly button 208 is further clicked, the event detecting unit 8 supplies the event information indicating the "grab all" or "delete partly" to the processing control unit 7. The processing control unit 7 receives the event information indicating the "grab all" or "delete partly" and then, the processing routine advances to step S9.

In step S9, the processing control unit 7 allows the grab all button 207 to select the overall results of extracting the object stored in the result buffer corresponding to the click operation, out of the result screens #1 to #3, and allows the selected results to be reflected (stored) to the object buffer 23, by controlling the result processing section 33 in the object extracting unit 3. Alternatively, in step S9, the processing control unit 7 controls the result processing section 33 in the object extracting unit 3 and, thereby, the grab partly button 208 selects the designated range out of the results of extracting the object which is stored in the result buffer corresponding to the click operation and reflects the selected range to the object buffer 23.

Figure 8A:
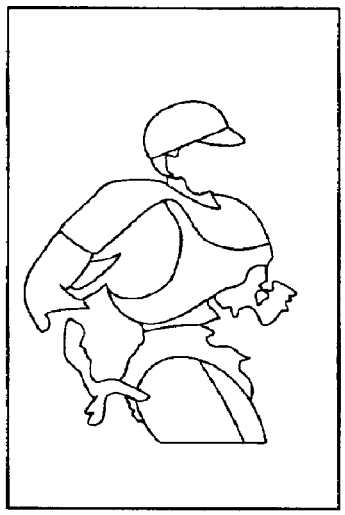
FIGS. 8A to 8D are diagrams for explaining "grab all" and "grab partly"
Figure 8B:
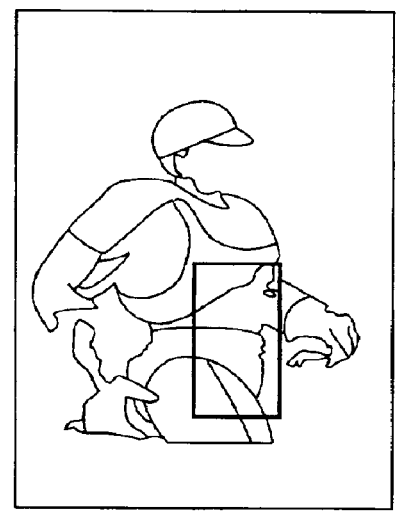
Figure 8C:
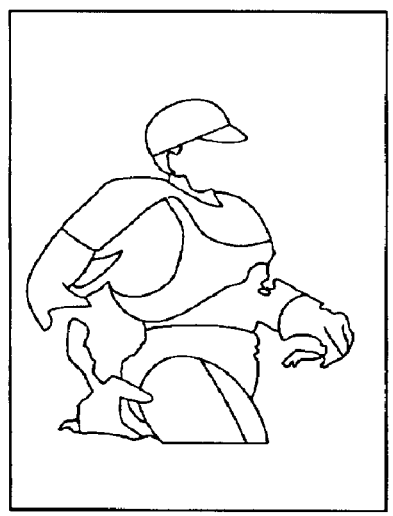

For example, when the storage contents of the object buffer 23 are as shown in FIG. 8A and the result of extracting the object stored in the result buffer corresponding to any desired result screen #i is as shown in FIG. 8B, if the grab all button 207 displayed on the result screen #i is operated, the storage contents of the object buffer 23 are updated (overwritten) to the result of extracting the object which is stored in the result buffer in FIG. 8B, as shown in FIG. 8C.

Figure 8D:
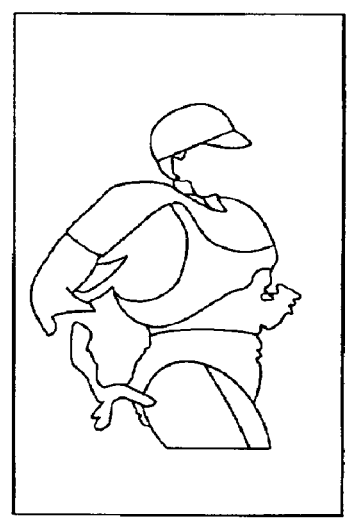

When a part of the result of extracting the object displayed on the result screen #i is designated by a marked rectangle in FIG. 8B and the grab partly button 208 displayed on the result screen #i is operated, the storage contents of the object buffer 23 is updated to the contents obtained by adding (combining) the designated result of extracting the object in FIG. 8B to the object in FIG. 8A, as shown in FIG. 8D.

The processing routine advances to step S10 whereupon the processing control unit 7 updates the history information on the image reflected on the object buffer 23 in step S9 by controlling the history managing unit 4. After that, the processing routine ends.

As mentioned above, the results of extracting the object are displayed on the result screens #1 to #3 in the three object extracting processing and the user clicks the grab all button 207 or the grab partly button 208 on any of the result screens #1 to #3. Then, the result of extracting the object displayed on the result screen is reflected to the object buffer 23. Consequently, the user may view the results of extracting the object in the different object extracting processing which are displayed on the result screens #1 to #3 and may select the preferable result. Further, the object buffer 23 reflects thereto the result which is selected by the user as the preferable one out of the results of extracting the object obtained in the different object extracting processing. Then, the object can be correctly extracted with easy operation.

The result screens #1 to #3 display thereon the object which is extracted in the different processing. However, the result of extracting the object in any desired processing is not so preferable as a whole and a part of the result of extracting the object is preferable. In this case, by designating a part of the result of extracting the object and clicking the grab partly button 208, the part of the object which is preferably extracted can be reflected to the object buffer 23 and, finally, the preferable result of extracting the object is stored in the object buffer 23.

When it is determined in step S1 that the event indicates "determine" for determining the final result of extracting the object from the target frame to be the image stored in the object buffer 23, the event detecting unit 8 supplies the event information indicating the "determine" to the processing control unit 7.

The processing control unit 7 receives the event information indicating "determine" and then, in step S11, it reads the object of the target frame, which is stored in the object buffer 23, also reads the history information on the target frame from the history managing unit 4, and supplies and stores the read information to the storage 1. In step S12, the processing control unit 7 determines whether or not the next target frame is stored in the storage 1. If NO in step S12, the processing routine skips to steps S13 and S14. After that, the processing routine ends.

It is determined in step S12 that the next target frame is stored in the storage 1, the processing routine advances to step S13 whereupon the processing control unit 7 sets the next target frame to be a new one, and supplies and stores it to the target frame buffer 21. Further, the processing control unit 7 clears the storage contents of the background buffer 22, the result buffers 33A to 33C, and the before-frame buffer 61, and the processing routine advances to step S14. In step S14, under the control of the processing control unit 7, the target frame newly recorded to the target frame buffer 21 in step S13 is subjected to initial extracting processing, which will be described later, and the processing routine ends.

A description is given of the object extracting processing which is performed by the object extracting unit 3 in FIG. 2.

According to the embodiment, the object extracting unit 3 fundamentally detects the boundary portion in the target frame and extracts a area surrounded by the boundary portion as the object.

Figure 9:
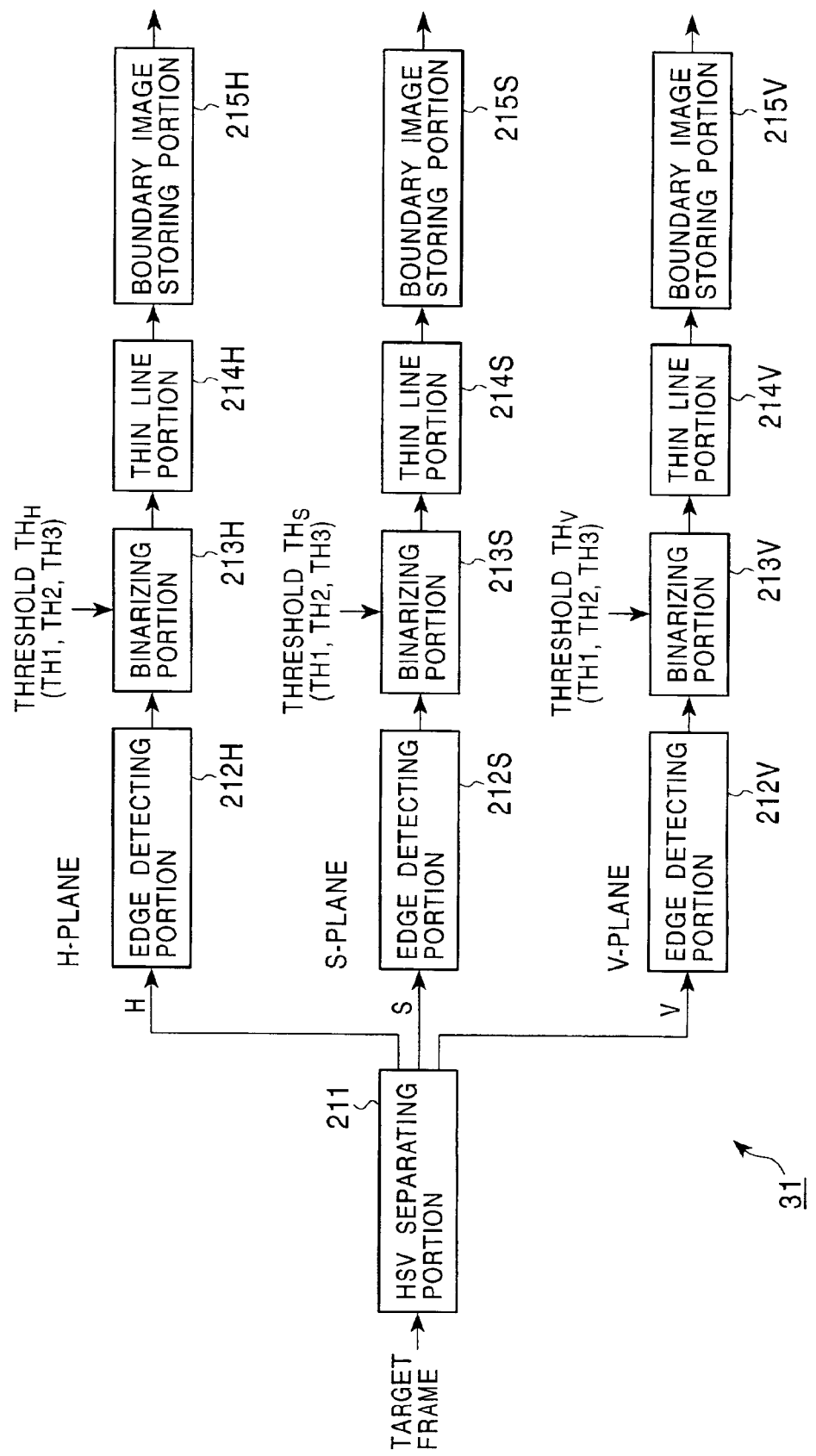
FIG. 9 is a block diagram showing an example of the structure of a boundary detecting section 31.

FIG. 9 shows an example of the structure of the boundary detecting section 31 in the object extracting unit 3.

An HSV separating portion 211 reads the target frame stored in the target frame buffer 21 and separates the pixel value into components of hue (H), saturation (S), and brightness (V). In other words, when the pixel value of the target frame is expressed by RGB (Red, Green, and Blue), the HSV separating portion 211 converts the pixel values of red, green, and Blue (RGB) into the pixel values of the H-, S-, V-components based on the following expressions.

$V = \max(R, G, B)$ $X = \min(R, G, B)$ $S = (V-X)/V \times 255$ $H = (G-B)/(V-X) \times 60$ where $V = R$ $H = (B-R)/(V-X+2) \times 60$ where $V = G$ $H = (R-G)/(V-X+4) \times 60$ where $V \neq R, G$ Incidentally, the R-, G-, and B-components, as the original pixel values, of the target frame are expressed by 8 bits (integer values of 0 to 255). Max ( ) denotes the maximum value within the range of ( ) and min ( ) denotes the minimum value of ( ).

The HSV separating portion 211 converts the H-, S-, and V-components into the pixel values, and supplies the converted pixel values of the H-, S-, and V-components to edge detecting portions 212H, 212S, and 212V, respectively.

Edge detecting portions 212H, 212S, and 212V detect edges of images comprising H-, S-, and V-components (hereinafter, referred to as an H-plane, an S-plane, and a V-plane, when necessary) from the HSV separating portion 211.

That is, the edge detecting portion 212 subjects the H-plane image to filtering of sobel operator, thereby detecting the edge from the H-plane image.

Specifically, the H-component at (x+1)-th one from the left of the H-plane image and at (y+1)-th one from the top designates I(x, y) and the edge detecting portion 212H obtains the edge image having a pixel value E(x, y) expressed by the following expressions.

$$E_H(x, y)=|2I(x, y+1)-I(x-1, y+1)-I(x+1, y+1)+2I(x, y-1)+I(x-1, y-1)+I(x+1, y+1)|$$

$$E_V(x, y)=|2I(x+1, y)-I(x+1, y-1)-I(x+1, y+1)+2I(x-1, y)+I(x-1, y-1)+I(x-1, y+1)|$$

$$E(x, y)=E_H(x, y)+E_V(x, y)$$

Similarly to the case of the edge detecting portion 212H, the edge detecting portions 212S and 212V obtain edge images of the S- and V-planes, respectively.

The edge images obtained from the H-, S- and V-planes are supplied to binarizing portions 213H, 213S, and 213V from the edge detecting portions 212H, 212S, and 212V. The binarizing portions 213H, 213S, and 213V compare the edge images of the H-, S- and V-planes with predetermined thresholds, thus binarizing the edge images. The thus-obtained binarized images of the H-, S- and V-planes (images having a pixel value of 0 or 1) are supplied to thin-line portions 214H, 214S, and 214V.

The thin-line portions 214H, 214S, and 214V subject the boundary portions of the binarized images of the H-, S- and V-planes which are supplied by the binarizing portions 213H, 213S, and 213V to the thin-line processing. The thus-obtained boundary images of the H-, S- and V-planes are supplied to boundary image storing portions 215H, 215S, and 215V.

Figures 10A, 10B:
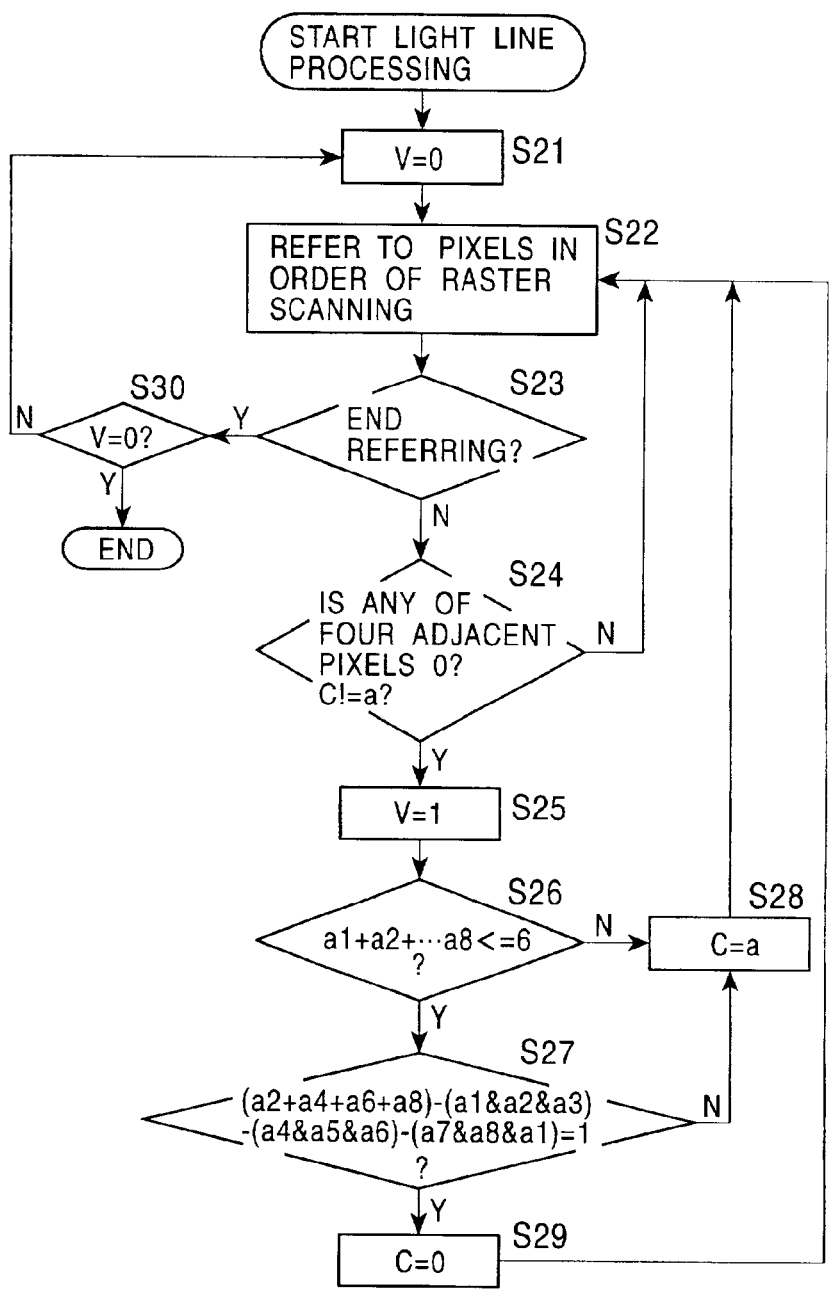

A description is given of the thin-line processing which the thin-line portion 214H in FIG. 9 subjects to the binarized image of the H-plane with reference to FIGS. 10A and 10B.

In the thin-line processing, as shown in the flowchart of FIG. 10A, in step S21, a predetermined flag is reset to be 0. In step S22, the pixels forming the binarized image of the H-plane are referred to in order of raster scanning. In step S23, it is determined whether or not there is a pixel which is not referred to in order of the raster scanning. If it is determined in step S23 that there is a pixel which is not referred to yet, the pixel, which is not referred to yet and is first detected in order of the raster scanning, is set as the target pixel, and the processing routine advances step S24.

In step S24, it is determined whether or not at least one pixel value is 0 among four adjacent pixels at the top and bottom and at the right and left of the target pixel and whether or not a pixel value c is equal to a predetermined value "a" (value other than 0 and 1). If it is determined in step S24 that neither of them are 0 among the four adjacent pixels at the top and bottom and at the right and left of the target pixel or that the pixel value c of the target pixel is equal to the predetermined value a, the processing routine returns to step S22. Then, the above-mentioned operations are iterated.

It is determined in step S24 that at least one pixel value is 0 and the pixel value c of the target pixel is not equal to the predetermined value "a", the processing routine advances to step S25 whereupon the flag v is set to be 1 and the processing routine advances to step S26.

In step S26, it is not determined whether or not an additional value (a1+a2+a3+a4+a5+a6+a7+a8) of eight values a1, a2, a3, a4, a5, a6, a7, and a8 of pixels adjacent to a target pixel c, as shown in FIG. 10B, is equal to or less than 6.

If it is determined in step S26 that the additional value of the eight values of pixels adjacent to the target pixel c is not equal to or less than 6, the processing routine advances to step S28 whereupon a the predetermined value "a" is set to the pixel value c of the target pixel. Then, the processing routine returns to step S22.

If it is determined in step S26 that the additional value of the eight values of pixels adjacent to the target pixel c is equal to or less than 6, the processing routine advances to step S27 whereupon it is determined whether or not the following conditional expression is satisfied.

(a2+a4+a6+a8)−(a1&a2&a3)−(a4&a5&a6)= (a7&a8&a1)=1, where "&" is AND operation.

If it is determined in step S27 that the conditional expression is not satisfied, the processing routine advances step S28 whereupon the pixel the predetermined value a is set to the pixel value c of the target pixel as mentioned above. Then, the processing routine returns to step S22.

If it is determined in step S27 that the conditional expressions is satisfied, the processing routine advances to step S29 whereupon the pixel value c of the target pixel is set to be 0. Then, the processing routine returns to step S22.

On the contrary, if it is determined in step S23 that there is no pixel which is not referred to in order of the raster scanning among the pixels forming the binarized image of the H-plane, that is, if all pixels forming the binarized image are processed as the target pixels, the processing routine advances to step S30 whereupon it is determined whether or not the flag v is 0.

If it is determined in step S30 whereupon the flag v is not 0, that is, if the flag v is 1, the processing routine returns to step S21. Then, the above-stated operations are iterated. If it is determined in step S30 that the flag v is 0, the processing routine ends.

After that, out of the pixels forming the image which is thus obtained in the above thin-line processing, the thin-line portion 214H converts the pixel value which is the predetermined value c into 1. The image after conversion is supplied to the boundary image storing portion 215H as the boundary image. Consequently, into the boundary image storing portion 215H, the boundary image having the boundary portion of 1 and the non-boundary portion of 0 in the H-plane is stored.

The thin-line portions 214S and 214V perform the processing similar to that of the thin-line portion 214H, thus determining the boundary images of the S- and H-planes.

The thin-line processing as described in FIG. 10A and 10B is disclosed in detail in a paper titled as "Topological Natures of the Sampled Binary Drawing" written by Yokoi, Toriwaki, and Fukumura of the Institute of Electronics, Information and Communication Engineers journal (D), J56-D, pp. 662–669, 1973, etc. The method for thin-line processing is not limited to the above method.

Figure 11A:
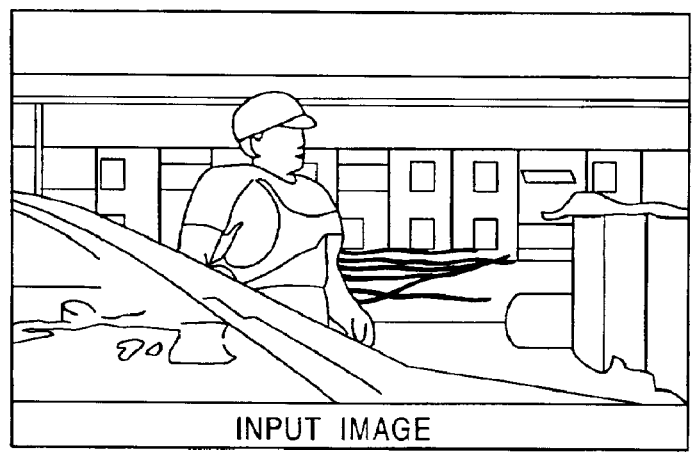
FIG. 11 is a diagram showing a boundary image.
Figure 11B:
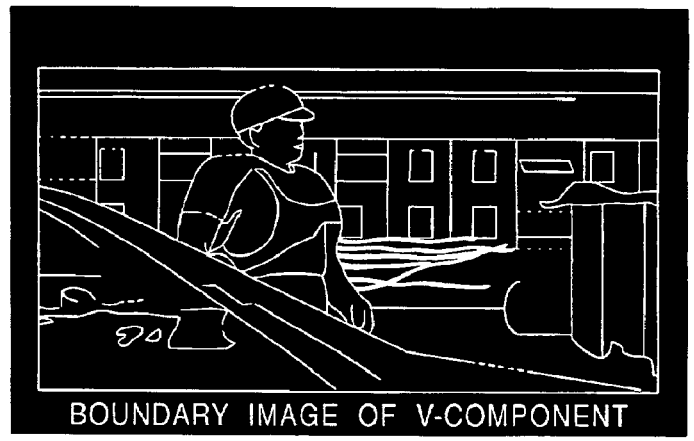
Figure 11C:
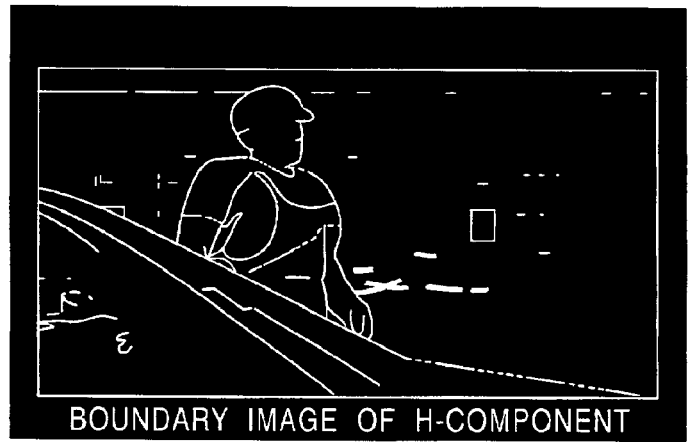

FIGS. 11A to 11C show of examples the boundary image. FIG. 11A shows the original image, FIG. 11B shows the boundary image of the V-plane which is obtained from the original image in FIG. 11A, and FIG. 11C shows the boundary image of the H-plane obtained from the original image in FIG. 11A. Comparing FIG. 11B with FIG. 11C, obviously, relatively small concave portion and convex portion are detected as the boundary portions in the V-plane and only relatively large concave portion and convex portion are detected as the boundary portions in the H-plane. In the H-, S- and V-planes, the concave portion and convex portions differ in size.

Referring to FIGS. 11B and 11C, white portions (boundary portions) have the pixel value 1 in the boundary image, and block portions have the pixel value 0 in the boundary image.

The boundary detecting section 31 forms not only the three boundary images of the H-, S- and V-planes but also three boundary images corresponding to three thresholds which are used when binarizing any of the planes. Hereinafter, the three thresholds of the H-, S- and V-planes, used upon forming the three boundary images, designate $TH_H$, $TH_s$, and $TH_v$. Further, hereinafter, the three thresholds, used upon forming the three boundary images of any of H-, S- and V-planes, designate TH1, TH2, and TH3.

The cut-out processing in the cut-out section 32 in FIG. 2 will be described with reference to the flowchart of FIG. 12. Although the boundary detecting section 31 obtains the three boundary images as described above, the cut-out processing is described herein by taking account of one boundary image. When necessary, a target output buffer indicates one of the three output buffers 32A to 32C, in which the image cut out from the target frame based on the target boundary image is stored.

In the cut-out processing, the storage contents of the target output buffer is cleared, thereafter, in step S41, the value of the pixel at the position on the target frame image, which is designated by the user's operation of the mouse 9, is read from the target frame buffer 21 and the read pixel value is written to the target output buffer. The object extracting unit 3 performs the processing when the user executes "designate position" or "designate rank" as shown in FIG. 4. However, in step S41, the value of the pixel at the position on the target frame, which the user proximately designates by "designate position", is written to the target output buffer. In step S42, it is determined whether or not an unprocessed pixel (pixel value) is stored in the target output buffer.

If it is determined in step S42 that the unprocessed pixel is stored in the target output frame, the processing routine advances to step S43 whereupon one arbitrary unprocessed pixel is set as the target pixel out of the pixels stored in the target output buffer. In step S44, values of eight adjacent pixels at the top, bottom, left, right, upper left, lower left, upper right, and lower right of the target pixel are obtained from the boundary image. Then, the processing routine advances to step S45.

In step S45, it is determined whether or not there is a boundary pixel as the boundary portion (that is, the pixel having the pixel value 1 in the embodiment), in the values of the eight adjacent pixels of the target pixel of the boundary image. If YES in step S45, the processing routine skips step S46 and returns to step S42 and then the above processing is iterated. In other words, when there is a boundary pixel in the values of the eight adjacent pixels of the target pixel, the values of the eight pixels are not written to the target output buffer.

If NO in step S45, the processing routine advances to step S46 whereupon the values of the eight pixels are read from the target frame buffer 21 and is stored at the corresponding address of the target output buffer. More specifically, when there is no boundary pixel in the values of the eight adjacent pixels of the target pixel, it is assumed that the eight adjacent pixels are an area in the object including the position clicked by the user through the mouse 9 (position designated by "designate position") and then the values of the eight pixels are written to the target output buffer.

After that, the processing routine returns to step S42 and the above processing is iterated.

When the pixel value has been already written to the pixel of the target output buffer, to which the pixel value is written in step S46, it is overwritten. When the pixel, to which the pixel value is overwritten, has been already set to be the target pixel, it is not set to be an unprocessed pixel even when it is overwritten. In other words, it is set to be the processed pixel.

If it is determined in step S42 that the unprocessed pixel is not stored in the target output buffer, the processing routine ends.

The cut-out processing of the cut-out section 32 will be further described with reference to FIG. 13.

Figure 13:
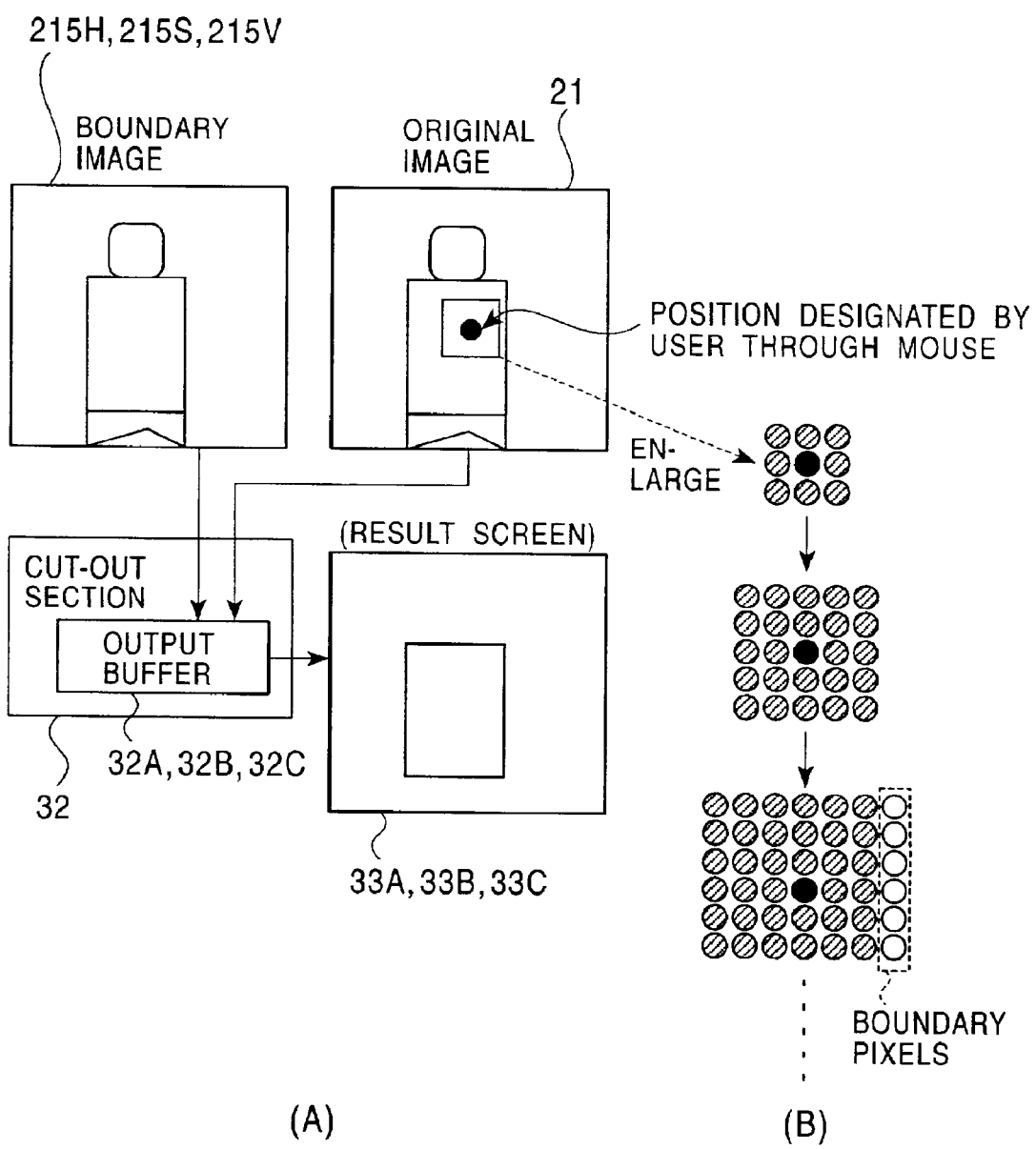
FIG. 13 is a diagram for explaining the processing of the cut-out section 32.

As shown in an image example (A) in FIG. 13, the cut-out section 32 reads the value of the pixel at the position on the target frame image, designated by the user's operation of the mouse 9, and writes it to the output buffer. Further, the cut-out section 32 sets one arbitrary unprocessed pixel to be the target pixel, out of the pixels stored in the output buffer, and obtains values of eight adjacent pixels of the target pixel out of the boundary image. When there is no boundary pixel in the values of the eight adjacent pixels of the target pixel in the boundary image, the cut-out section 32 reads the values of the eight pixels from the target frame buffer 21, and writes the read pixel value to the output buffer. Consequently, as shown in an enlarged view (B) of the image example (A) in FIG. 13, the values of the pixels forming the inside of the area surrounded by the boundary pixels, whose ORIGIN is the pixel (shown by black points in the enlarged view (B) in FIG. 13) designated by the user through the mouse 9, are written to the output buffer.

By iterating the above processing until there is no unprocessed pixels in the pixels stored in the output buffer, the area surrounded by the boundary pixels is stored out of the image of the target frame.

Since the area of the target frame surrounded by the boundary portion, including the origin designated by the user as the object is cut out through the above cut-out processing, the area forming the object can be cut out with high accuracy. That is, when the overall area forming the object is automatically cut out, it is difficult to determine whether or not any desired area forms the object. Consequently, the area starts to be cut out from the pixel forming no object. On the contrary, through the cut-out processing in FIG. 12, the point designated by the user as the object becomes the ORIGIN and, based thereon, the area is cut out. Therefore, the area starts to be cut out from the pixel forming the object without fail, and the area forming the object can be cut out with high accuracy.

Figure 12:
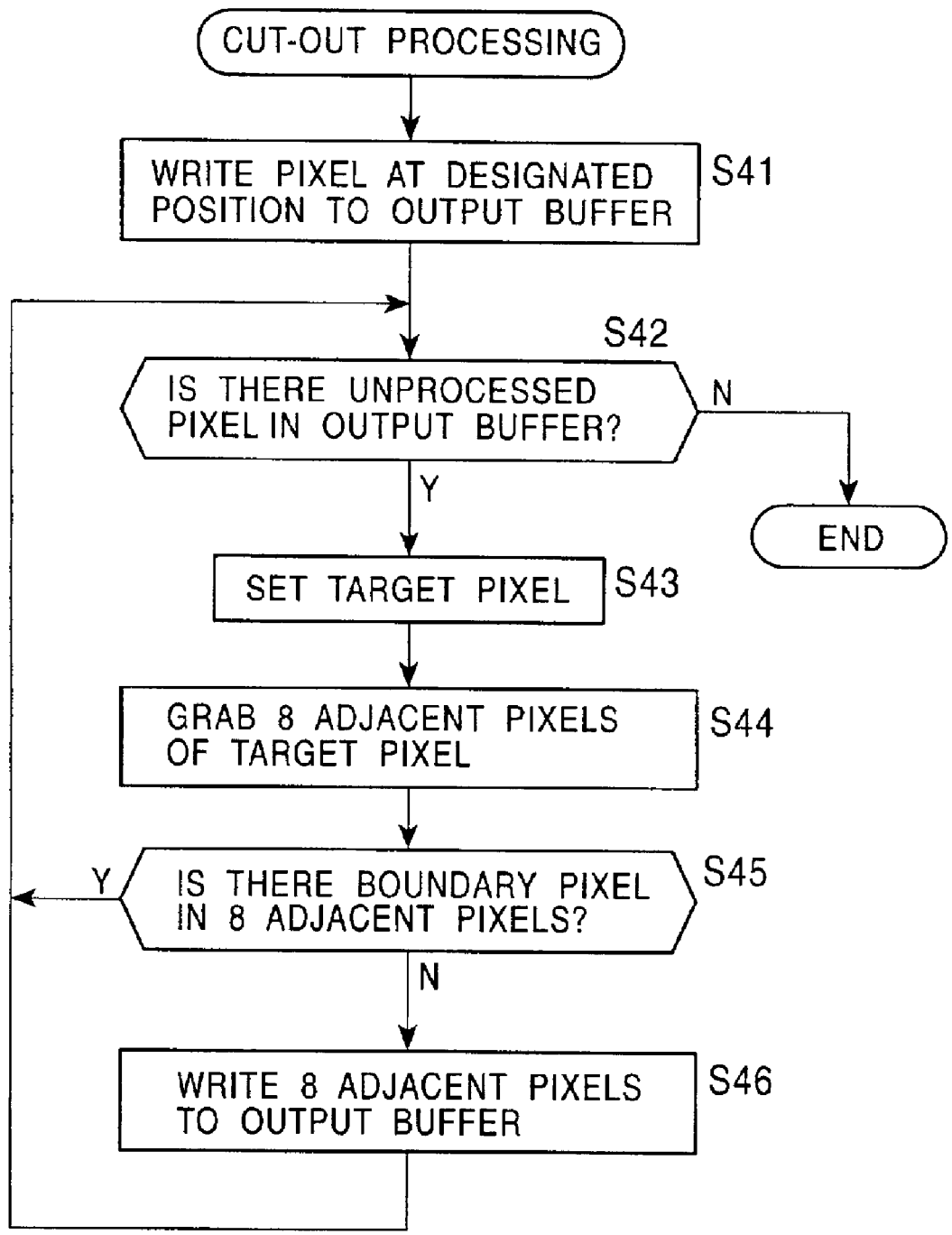
FIG. 12 is a flowchart for explaining processing of a cut-out section 32.

The cut-out processing in FIG. 12 is performed based on the three boundary images obtained by the boundary detecting section 31 and the results of cutting out the area based on the three boundary images are stored in the output buffers 32A to 32C, respectively. The storage contents of the output buffers 32A to 32C are transferred to the result buffers 33A to 33C and the results of extracting the object obtained in the different processing are displayed on the result screens #1 to #3.

The history information managed by the history managing unit 4 in FIG. 2 will be described with reference to FIGS. 14 to 16.

All or a part of the results of extracting the object, which are stored in any of the result buffers 33A to 33C by "grab all" or "grab partly", is reflected (written) to the object buffer 23, the history managing unit 4 updates the designated position stored in the designated position storing section 41, the history image stored in the history image storing section 42, and entry to the parameter table storing section 43.

For example, when extracting, from the target frame which displays thereon the overall of a person, a portion indicating the person, it is assumed that the image of the body and the leg has been already extracted as the object and stored in the object buffer 23. In this case, as shown in the image (A), the history image storing section 42 stores therein a plane of the boundary image used for extracting the body, a plane of the boundary image used for extracting both the pixels of the body having a pixel value ID1 corresponding to the threshold used for obtaining the boundary image and the leg, and the history image comprising the pixels of the leg having a pixel value ID2 corresponding to the threshold used for obtaining the boundary image.

Figure 14:
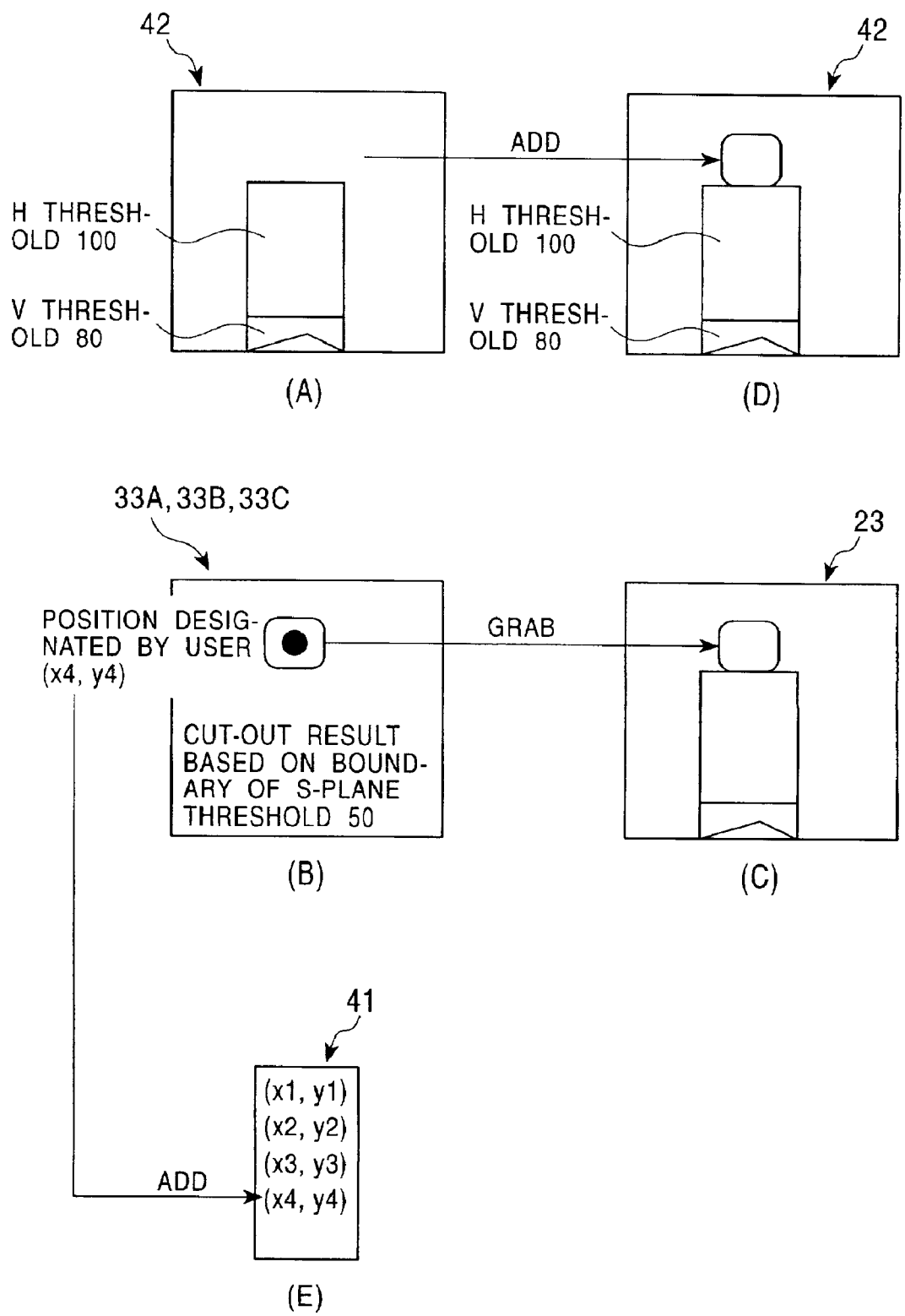
FIG. 14 is diagram for explaining the update of history information.

In an example (A) of FIG. 14, the H-plane is used as the boundary image for extracting the body and a threshold for obtaining the boundary image of the H-plane which is used for binarization is 100. The V-plane is used as the boundary image for obtaining the leg and a threshold for obtaining the boundary image of the V-plane is 80.

In this case, in the parameter table storing section 43, ID1, the H-plane, and the threshold 100 have a corresponding relationship, and ID2, the V-plane, and the threshold 80 have a corresponding relationship.

Hereinafter, properly, a parameter set designates a set of the threshold used for obtaining the boundary image and the plane of the boundary image used for extracting the object stored in the object buffer 23.

Thereafter, the user designates the pixels of the head in the target frame in which all of the person is displayed by the click through the mouse 9. Then, the object extracting unit 3 performs three object extracting processing as stated above. As shown in an example (B) of FIG. 14, the result buffers 33A to 33C store therein the results of extracting the object of the head in the three object extracting processing, and the result screens #1 to #3 display thereon the storage contents the result buffers 33A to 33C.

The user refers to the result of extracting the object of the head displayed on the result screens #1 to #3 and grabs all of preferable results. Then, out of the results of extracting the object of the head displayed on the result screens #1 to #3, the results which are entirely grabbed is selected and it is reflected to the object buffer 23, as shown in an example (C) of FIG. 14.

In this case, the history managing unit 4 registers, to the parameter table storing section 43, the plane of the boundary image for obtaining a parameter set of the result of extracting the object of the head which is reflected to the object buffer 23 and the threshold for obtaining the boundary image, corresponding to the unique ID3.

Further, as shown in an example (D) of FIG. 14, the history managing unit 4 writes ID3 to the value of the pixel forming the head in the history image storing section 42, thus updating the history image. As shown in an example (D) of FIG. 14, the S-plane designates the plane of the boundary image for extracting the head and the threshold for obtaining the boundary image is 50.

A shown an example (E) of FIG. 14, the history managing unit 4 adds, to the designated position storing section 41, coordinates (x4, y4) indicating the designated position on the target frame clicked by the user when obtaining the result of extracting the object of the head reflected to the object buffer 23. In the example (E) of FIG. 14, the designated position storing section 41 has already stored coordinates (x1, y1), (x2, y2), and (x3, y3) of three designated positions. In addition thereto, the designated position storing section 41 stores therein new coordinates (x4, y4).

The above-mentioned history information of the target frame is used for extracting the object out of the new target frame when the next frame becomes the new target frame.

Figure 15:
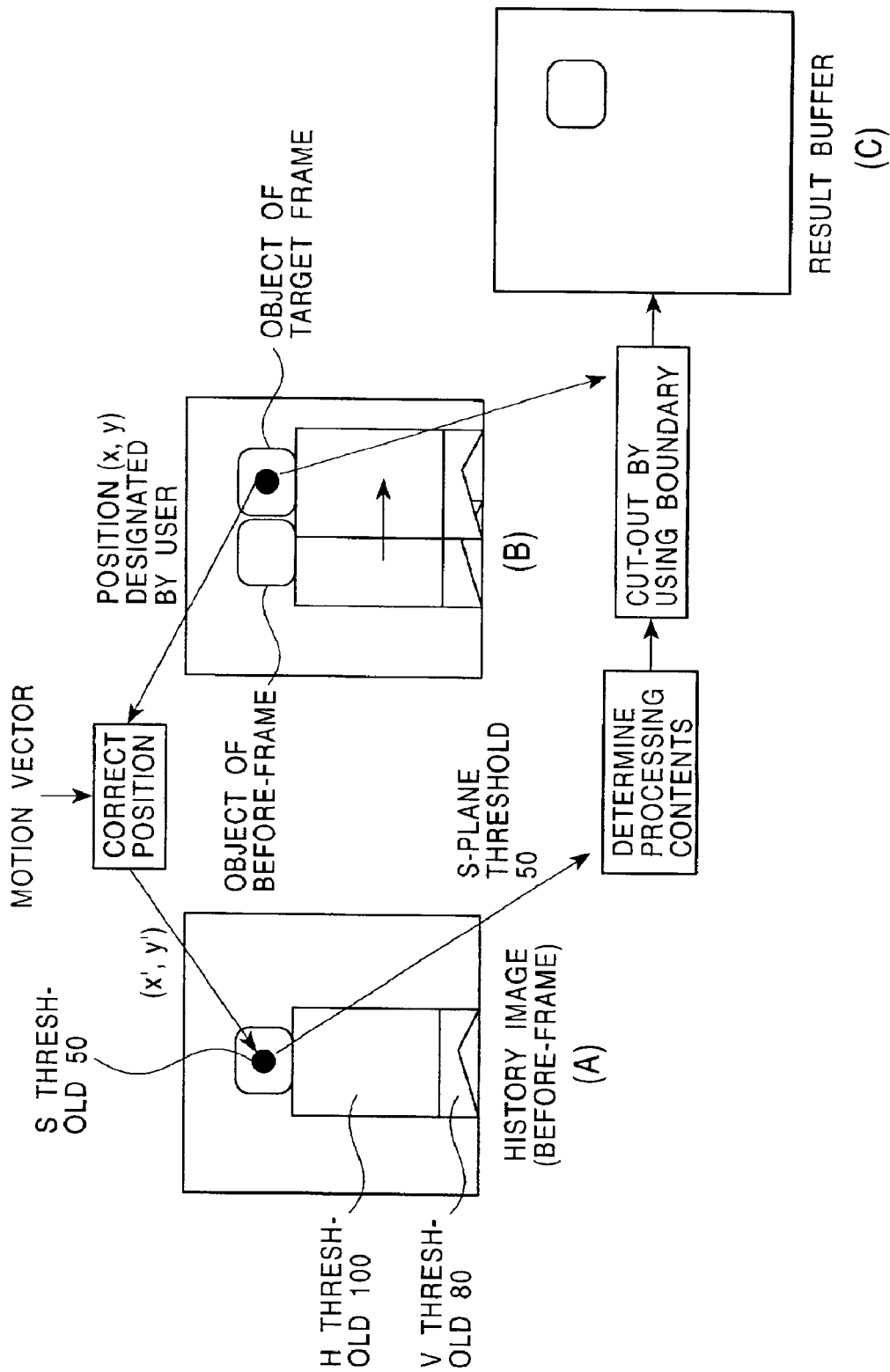
FIG. 15 is a diagram for explaining the extraction of an object based on the history information.

That is, in an example (A) of FIG. 15, when obtaining the history image of a before-frame which is before one frame of the target frame, any desired point is clicked by the user's operation of the mouse 9. In this case, the processing control unit 7 controls the motion detecting unit 6, thereby obtaining a motion vector ($v_x$, $v_y$) setting the before-frame as the reference. Further, the processing control unit 7 allows the position correcting section 71 stored therein to correcting the designated position (x, y) by using the motion vector ($v_x$, $v_y$), thereby obtaining a position (x', y') on the before-frame corresponding to the designated position (x, y). In other words, the position correcting section 71 obtains the position (x', y') on the before-frame corresponding to the designated position (x, y) based on an arithmetic expression (x', y')=(x, y)−($v_x$, $v_y$).

Thereafter, the processing control unit 7 obtains ID of a parameter set at the position (x', y') on the before-frame corresponding to the designated position (x, y) by referring to the history image of the before-frame stored in the history image storing section 42. Further, the processing control unit 7 obtains a parameter set corresponding the obtained ID by referring to the parameter table storing section 43. In addition, the processing control unit 7 determines an operation for forming three boundary images based on the thus-obtained parameter set and an operation for cutting out, from the three boundary images, the area at the designated position (x, y) as the origin, and supplies the determined information to the object extracting unit 3. As will be described later in FIGS. 18A to 18C, the processing control unit 7 forms three boundary images by binarizing three thresholds of the threshold corresponding ID, a threshold −20, and a threshold +20 by using the plane corresponding to ID.

Consequently, as shown in an image example (B) of FIG. 15, the object extracting unit 3 forms the three boundary images based on the parameter set corresponding to the determined information for the target frame, and cuts out the area at the designated position (x, y) as the origin, out of the three boundary images, thereby extracting three-pattern objects. As shown an image example (C) of FIG. 15, the three-pattern objects which are extracted from the target frame are stored in the result buffers 33A to 33C and then are displayed on the result screens #1 to #3.

It is expected that the preferable object at the designated position inputted by the user is extracted from the target frame in the manner similar to that in the case of extracting the object corresponding to the before-frame. Therefore, the preferable result of extracting the object can be quickly obtained by forming the boundary image based on the parameter set corresponding to the determined information and by cutting out the area at the designated position (x, y) as the origin.

That is, when the user performs "designate position" the object extracting unit 3 extracts the object at the position designated by "designate position" through three processing. If all results of extracting the object through the three processing are unpreferable, the user performs "designate rank", thereby extracting the object by replacing the parameter set. Consequently, when the history information of the before-frame is not used, the user must perform "designate rank" to obtain the preferable result of extracting the object. On the contrary, when the history information of the before-frame is used, the preferable result of extracting the object can be quickly obtained without user's "designate rank", only with easy operation for designating some points on the object of the target frame.

When extracting the object from the target frame, the history information of the before-frame can be used as follows.

Figure 16:
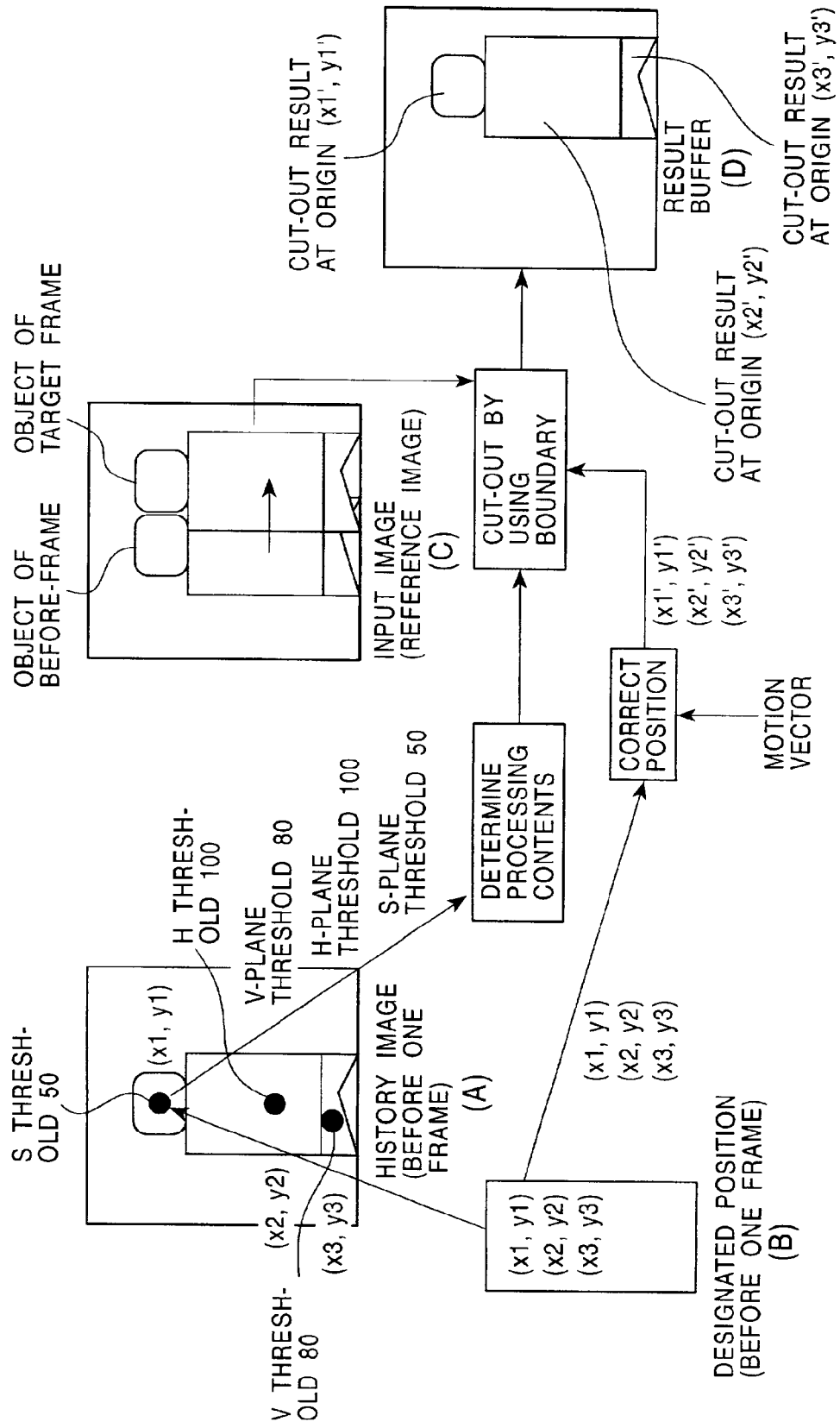
FIG. 16 is a diagram for explaining the extraction of the object based on the history information.

In other words, with respect to the frame before one frame of the target frame (before-frame), it is assumed that the history image as shown an image example (A) of FIG. 16 and three designated positions (x1, y1), (x2, y2), and (x3, y3) shown in an image example (B) of FIG. 16 can be obtained.

In this case, the processing control unit 7 controls the motion detecting unit 6, thereby obtaining the motion vector ($v_x$, $v_y$) of the target frame setting the designated position (x1, y1) of the before-frame. Further, the processing control unit 7 allows the position correcting section 71 stored therein to correct the designated position (x1, y1) of the before-frame, thereby obtaining a position (x1', y1') on the target frame corresponding to the designated position (x1, y1) of the before-frame. In this case, the position correcting section 71 obtains the position (x1', y1') on the target frame corresponding to the designated position (x1, y1) of the before-frame based on an arithmetic expression (x1', y1')= (x1, y1)+($v_x$, $v_y$).

Thereafter, the processing control unit 7 obtains ID of a parameter set at the position (x1, y1) by referring to the history image of the before-frame stored in the history image storing section 42. Further, the processing control unit 7 obtains a parameter set corresponding the obtained ID by referring to the parameter table storing section 43. In addition, the processing control unit 7 determines an operation for forming three boundary images based on the thus-obtained parameter set and an operation for cutting out, from the three boundary images, the area at the designated position (x1', y1') as the origin on the target frame corresponding to the designated position (x1, y1) of the before-frame, and supplies the determined information to the object extracting unit 3.

Consequently, as shown in an image example (C) of FIG. 16, the object extracting unit 3 forms the three boundary images based on the parameter set corresponding to the determined information for the target frame, and cuts out the area at the designated position (x1', y1') as the origin, out of the three boundary images, thereby extracting three-pattern objects.

Of the three designated positions (x1, y1), (x2, y2), and (x3, y3) of the before-frame, the remaining designated positions (x2, y2) and (x3, y3) are subjected to the above-mentioned processing. Thus, the three-pattern objects at positions (x2', y2') and (x3', y3') on the target frame corresponding the two designated positions as the origins are extracted.

Thus, the portions of the object, which are extracted from the target frame, are thereafter combined while setting the positions on the target frame corresponding to the designated positions of the before-frame. The thus-obtained results of extracting the object is stored in the result buffer and displayed on the result screen, as shown an image example (D) of FIG. 16.

It is expected that the preferable object at the designated position is extracted from the target frame in the manner similar to that in the case of extracting the object corresponding to the before-frame. Therefore, the preferable result of extracting the object can be quickly obtained by forming the three boundary images based on the parameter set corresponding to the determined information and by cutting out the area at the position, as the origin, of the target frame corresponding to the designated position (x, y) of the before-frame.

Although the user must designate the point on the object of the target frame in FIG. 15, he does not need to perform the designating operation in the case of FIG. 16. Therefore, the user's operation load can be further reduced.

As described in FIG. 16, the object of the target frame is extracted by using the history information of the before-frame before the user designates the point on the object of the target frame. By using a pull-down menu displayed by clicking the use record button 202 on the reference screen (in FIG. 3), it is determined whether or not the result of extracting the object is displayed on the result screens #1 to #3.

Figure 4:
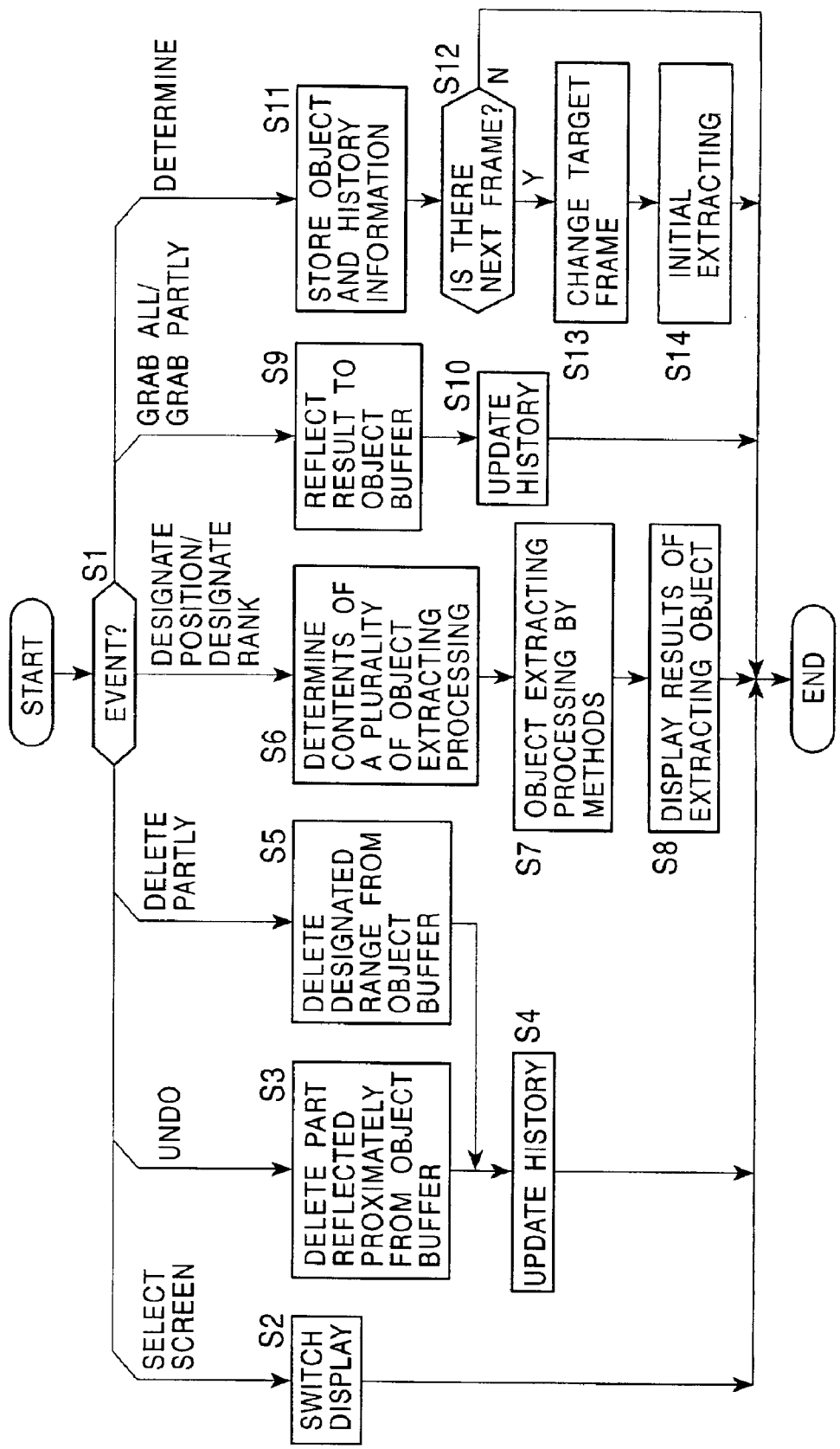
FIG. 4 is a flowchart for explaining processing of the image processing apparatus in FIG. 2.
Figure 5:
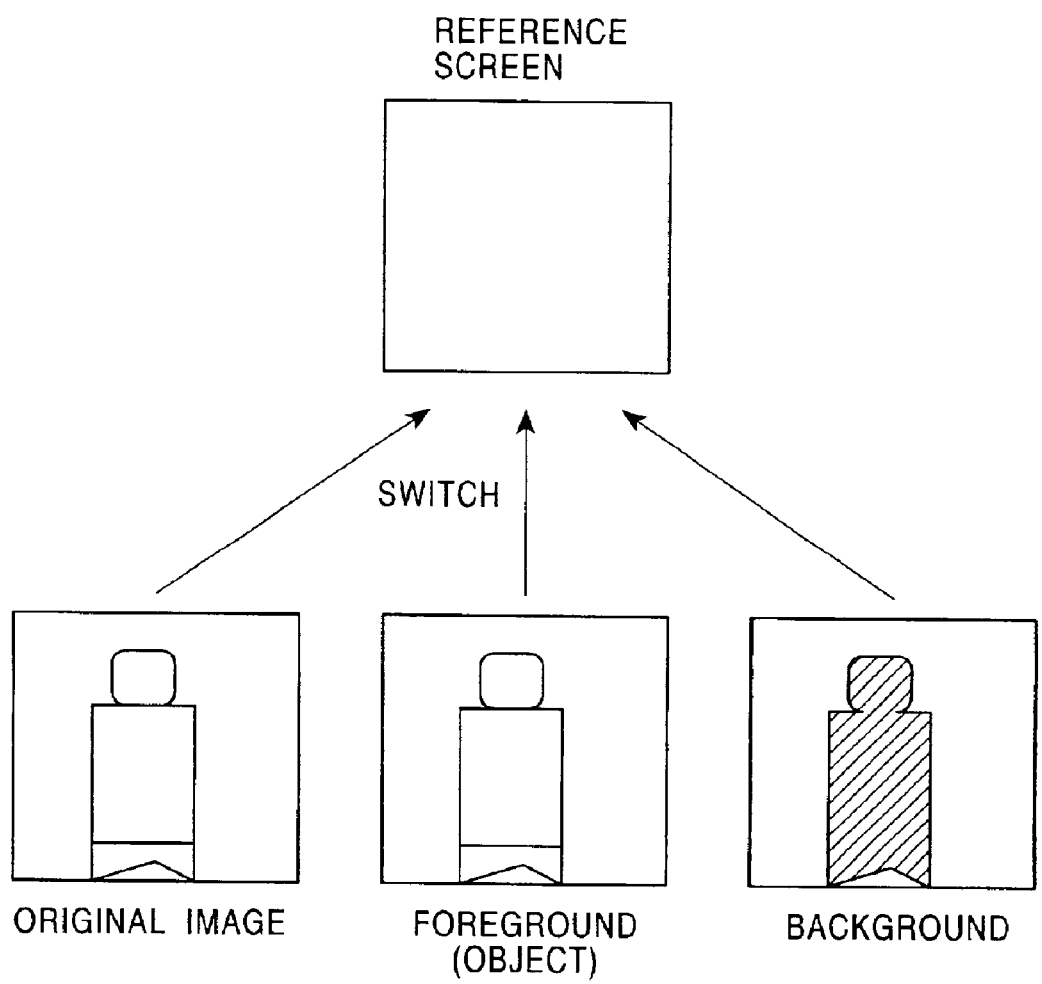
FIG. 5 is a diagram for explaining a display switching operation on a basic screen.

Next, a description is given of the processing for determining the contents of a plurality of object extracting processing, which is performed by the processing control unit 7 in steps S6 in FIG. 4 with reference to the flowchart of FIG. 17.

First, in step S51, the processing control unit 7 determines the event information from the event detecting unit 8 indicates "designate position" or "designate rank". If it is determined in step S51 that the event information indicates "designate position", in step S52, the processing control unit 7 determines whether or not the history information of the before-frame is stored in the history managing unit 4.

If YES in step S52, in step S53, the processing control unit 7 determines the contents of the three object extracting processing in which the object is extracted from the target frame based on the history information of the before-frame, as mentioned above in FIG. 15, and supplies the determined information to the object extracting unit 3. Then, the processing routine ends.

If NO in step S52, that is, if the target frame is first one among the frames of the moving pictures stored in the storage 1, in step S54, the processing control unit 7 determines, to be a default value, the contents of the three object extracting processing in which the object is extracted from the target frame. Further, the processing control unit 7 supplies the determined information to the object extracting unit 3 and, then, processing routine ends.

On the contrary, if it is determined in step S51 that the event information indicates "designate rank", in step S55, the processing control unit 7 determines the contents of the three object extracting processing, in which the object is extracted from the target frame, by the user's operation of the mouse 9 based on the ranking, and supplies the determined information to the object extracting unit 3. Then, the processing routine ends.

A specific description is given of a method for determining the contents of the object extracting processing in steps S53 to S55 in FIG. 17 with reference to the flowcharts in FIGS. 18A to 18C. If the event information indicates "designate position", the user designates any desired position on the target frame by clicking the mouse 9. Further, it is assumed that the coordinates of the position designated by the user are included in the event information. If the event information indicates "rank position", the user ranks the results of extracting the object, which are displayed on the three result screens #1 to #3, by operating the mouse 9. Further, it is assumed that the obtained rank of the results of extracting the object (herein, first to third ranks) is included in the event information.

A description is given of a case in which the contents of the object extracting processing are determined based on the history information of the before-information in step S53 in FIG. 17 with reference to the flowchart of FIG. 18A. First, in step S61, the processing control unit 7 determines, by referring to the history information of the before-information, that the boundary image of the same plane as that of the boundary image when obtaining the final result of extracting the object of the before-frame (object which is finally stored in the object buffer 23) is used.

In other words, by referring to the history information of the before-frame, the processing control unit 7 recognizes the plane of the boundary image when extracting, as the object, the pixel at the position of the before-frame corresponding to the position of the target frame designated by the user's operation of the mouse 9. Further, the processing control unit 7 determines that the boundary detecting section 31 forms the boundary image of the plane. Hereinafter, a determined plane designates the plane of the boundary image which is used when extracting the object of the target frame, when necessary.

In step S62, by referring to the history information of the before-frame, the processing control unit 7 recognizes the threshold used for binarization, for obtaining the boundary image when extracting, as the object, the pixel at the position of the before-frame corresponding to the position of the target frame designated by the user's operation of the mouse 9. Further, the processing control unit 7 determines the threshold to be a second threshold TH2 out of three thresholds TH1 to TH3 used of binarization, for obtaining the boundary image of the determined plane with respect to the target image. Hereinafter, the thus-obtained threshold TH2 designates a determined threshold, when necessary.

Thereafter, in step S63, the processing control unit 7 determines the remaining two thresholds TH1 and TH3 excluding the determined threshold TH2 out of the three thresholds TH1 to TH3, based on expressions of TH1=TH2−20 and TH3=TH2+20 while using the determined threshold TH2. Further, the processing control unit 7 supplies the threshold TH2, the thresholds TH1 and TH3 determined based on the determined threshold TH2, as the determined information, to the object extracting unit 3. Then, the processing routine ends.

In this case, in the boundary detecting section 31 (in FIG. 9) in the object extracting unit 3, any of edge detecting portions 212H, 212S, and 212V performs the operation for detecting the edge of the image of the determined plane. A binarizing portion connected to the edge detecting portion binarizes the detected edge by using the three thresholds of the determined threshold TH2 and the thresholds TH1 and TH3 determined based on the determined threshold TH2, thus forming the three boundary images. Further, the cut-out section 32 in the object extracting unit 3 cuts out the area shown in FIGS. 12 and 13 at the position, as the origin, on the target frame designated by the user, for each of the three boundary images which are formed by the boundary detecting section 31.

If there is the history information of the before-frame, the contents of the object extracting processing of the target frame are determined based on the history information and the position on the target frame designated by the used. Therefore, when the target frame has the portion having the same characteristics as those of the before-frame, the object of the target frame is extracted in the manner similar to that of the before-frame. Consequently, the object can be correctly with easy operation.

A description is given of the processing of the processing control unit 7 in step S54 in FIG. 17 when the contents of the object extracting processing are determined to be a default value, with reference to the flowchart in FIG. 18B.

First, in step S71, the processing control unit 7 whether or not the average of the V-component of the pixels near the pixels at the designated position, on the target frame, which is clicked by the user's click of the mouse 9, i.e., the average of the V-component of <(8 pixels in the vertical direction)×(8 pixels in the horizontal direction)>including the designated pixels is less than 50.

If YES in step S71, in step S72, the processing control unit 7 determines that the boundary detecting section 31 forms the boundary image of the V-plane.

More specifically, if the boundary image of the H- or S-plane is used for the area having a small V-component, obviously, the area is incorrectly cut out, as compared with the case of using the boundary image of the V-plane. Therefore, in step S72, as mentioned above, the V-plane is determined.

In step S73, the processing control unit 7 determines the three thresholds TH1 to TH3 used for binarization, for obtaining the boundary image of the V-plane as the determined plane to be 40, 100, and 180 as the default values. Further, the processing control unit 7 supplies the thresholds TH1 to TH3 and the information indicating that the determined plane is the V-plane, as the determined information, to the object extracting unit 3. Then, the processing routine ends.

In the boundary detecting section 31 in the object detecting unit 3 (FIG. 9), of the edge detecting portions 212H, 212S, and 212V, the edge detecting portion 212V performs the edge detection of the V-plane as the determined plane. The binarizing portion 213V connected to the edge detecting portion 212V binarizes the detected edge by using the three thresholds 40, 100, 180 as the thresholds TH1 to TH3, thus forming the three boundary images. Further, the cut-out section 32 in the object extracting unit 3 cuts out the area described in FIGS. 12 and 13 at the position, as the origin, on the target frame designated by the user, from the three boundary images formed by the boundary detecting section 31.

If NO in step S71, in step S74, the processing control unit 7 determines that the boundary detecting section 31 forms the boundary images of the H-, S- and V-planes.

In other words, with respect to the area having the large V-component, the plane of the boundary image for correctly cutting out the area is different depending on characteristics of the area. Since there is no history information of the before-frame, it can be hardly expected that the boundary image of which one of the planes is suitable to the operation for cutting out the area. Then, in step S74, the three H-, S- and V-planes becomes the determined planes.

In step S75, the processing control unit 7 determines thresholds $TH_H$ and $TH_V$, for binarization when obtaining the boundary images of the H-, V-, and S-planes as the determined planes to be 100 as the default value, and supplies the thresholds $TH_H$ and $TH_V$ and information indicating that the S- and V-planes are the determined planes. The processing routine ends.

In the boundary detecting section 31 in the object detecting unit 3 (FIG. 9), the edge detecting portions 212H, 212S, and 212V performs the edge detection of the H-plane, the S-plane, and the V-plane. The binarizing portions 213H, 213S, and 213V connected to the edge detecting portions 212H, 213S, and 213V binarize the detected edge by using the three thresholds $TH_H$, $TH_S$, and $TH_V$, (all of them are 100), thus forming the three boundary images. Further, the cut-out section 32 in the object extracting unit 3 cuts out the area described in FIGS. 12 and 13 at the position, as the origin, on the target frame designated by the user, from the three boundary images formed by the boundary detecting section 31.

A description is given of the processing of the processing control unit 7 in step S55 in FIG. 17 when determining the contents of the object extracting processing based on the designated rank, with reference to the flowchart in FIG. 18C.

First, in step S81, the processing control unit 7 determines whether the results of extracting the object obtained by using the boundary images of the H-, S- and V-planes (hereinafter, the ranking for plane) are performed or the results of extracting the object obtained by using the boundary images binarized by three different thresholds (hereinafter, the ranking for threshold) is performed.

If it is the ranking for plane in step S81, in step S82, the processing control unit 7 recognizes the rank of the results of extracting the object obtained by using the boundary images of the three H-, S- and V-planes, and determines that the boundary detecting section 31 forms the boundary image of the plane of the first-ranked result of extracting the object. That is, the processing control unit 7 sets the plane of the boundary image of the first-ranked result of extracting the object to be the determined plane.

In step S83, the processing control unit 7 determines the three thresholds TH1 to TH3 for binarization when obtaining the boundary image of the determined plane to default values, for example, 40, 100, and 180, and supplies the thresholds TH1 to TH3 and the information indicating the V-plane is determined, as the determined information, to the object extracting unit 3. Then, the processing routine ends.

In the boundary detecting section 31 in the object extracting unit 3 (in FIG. 9), any of the edge detecting portions 212H, 212S, and 212V detects the edge of the image of determined plane (plane of the boundary image in which the first-ranked result of extracting the object is obtained). The binarizing portion connected to the edge detecting portion binarizes the edge by using the three thresholds 40, 100, and 180 as the thresholds TH1 to TH3, thus forming the three boundary images. Further, the cut-out section 32 in the object extracting unit 3 cuts out the area shown in FIGS. 12 and 13 at the position, as the origin, on the target frame designated by the user proximately, out of the three boundary images formed in the boundary detecting section 31.

If it is the ranking for threshold in step S81, in step S84, the processing control unit 7 determines that the boundary detecting section 31 forms the boundary image of the same plane as the plane of the boundary image used when obtaining the result of extracting the object of the ranked target frame. That is, the processing control unit 7 determines the plane of the boundary image used when obtaining the result of extracting the object of the target frame at the previous time to be the determined plane.

In step S85, the processing control unit 7 determines the three thresholds TH1 to TH3 for binarization when obtaining the boundary image of the determined plane based on the ranking for threshold. In other words, the processing control unit 7 determines the first-ranked threshold to be the threshold TH1, out of the three thresholds when obtaining the result of extracting the object at the previous time. Further, the processing control unit 7 determines the average of the first-ranked threshold and the second-ranked threshold to the threshold TH2, out of the three thresholds when obtaining the result of extracting the object at the previous time. In addition, the processing control unit 7 determines the second-ranked threshold to be the threshold TH3, out of the three thresholds when obtaining the result of extracting the object at the previous time. Thereafter, the processing control unit 7 supplies the determined plane and the thresholds TH1 to TH3 as the determined information. Then, the processing routine ends.

In the boundary detecting section 31 in the object extracting unit 3 (in FIG. 9), any of the edge detecting portions 212H, 212S, and 212V detects the edge of the image of the determined plane (the same plane as the plane of the boundary image when obtaining the result of extracting the object at the previous time). The binarizing portion connected to the edge detecting portion binarizes the edge based on the ranking for threshold at the previous time using the three determined thresholds TH1 to TH3, thus forming the three boundary images. Further, the cut-out section 32 in the object extracting unit 3 cuts out the area shown in FIGS. 12 and 13 at the position, as the origin, on the target frame proximately designated by the user, out of the three boundary images formed by the boundary detecting section 31.

As mentioned above, the user designates any desired position on the target frame and then there is not history information of the before-frame, thus determining the contents of the object extracting processing. Further, when the average of the V-component near the designated position, is not less than 50, the three results of extracting the object is obtained out of the boundary images of the three H-, S- and V-planes (in steps S71, S74, and S75 in FIG. 18B). The planes of the three results of extracting the object is ranked and the three results of extracting the object are obtained out of the three boundary images formed based on the image of one plane of the first-ranked result and the three thresholds TH1 to TH3 (in steps S81 to S83 in FIG. 18C).

Further, even when the user designates any desired position on the target frame and there is no history information of the before-frame and the average of the V-component near the designated position is less than 50, the three results of extracting the object are obtained based on the image of the one V-plane and the three boundary images formed by using the three thresholds TH1 to TH3 as the default values (in steps S71 to S73 in FIG. 18B).

When the user designates any desired position on the target frame and there is history information of the before-frame, the three results of extracting the object area obtained based on the image of one plane determined on the basis of the history information and the three boundary images formed by using the three thresholds TH1 to TH3 determined on the basis of the history information (in FIG. 18A).

The three results of extracting the object are obtained based on the image of one plane and the three boundary images formed by using the three thresholds and, thereafter, are ranked for thresholds. Consequently, based on the rank for threshold, the three thresholds TH1 to TH3 are updated (in steps S81, S84, and S85 in FIG. 18C).

Figure 19:
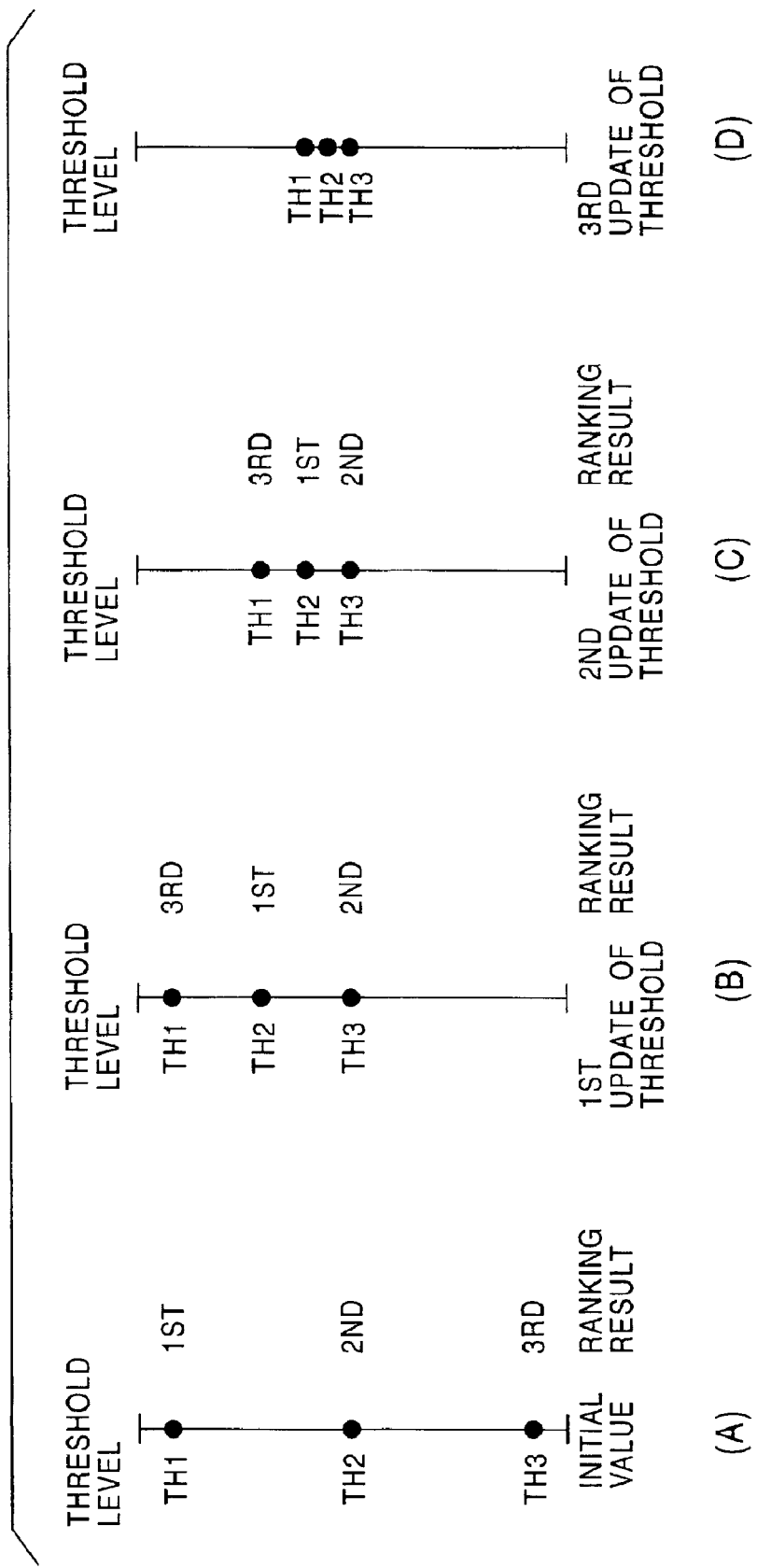
FIG. 19 is a diagram for explaining the update of a threshold.

As shown in a ranking example (A) in FIG. 19, when the thresholds TH1 to TH3 are ranked to be first to third ones, respectively, the threshold TH1 to TH3 are determined to be the previous first-ranked threshold, the average of the previous first- and second-ranked thresholds, and the previous second-threshold TH2, respectively. Further, the three results of extracting the object, which are obtained by using the three thresholds TH1 to TH3, are ranked and, consequently, as shown in a ranking example (B) of FIG. 19, the thresholds TH1 to TH3 are ranked to third, first, and second thresholds, respectively. In this case, in the next object extracting processing, as shown in a ranking example (C) of FIG. 19, the thresholds TH1 to TH3 are determined to be the previous first-ranked threshold, the average of the previous first- and second-ranked thresholds, and the previous second-ranked threshold, respectively. The three results of extracting the object, which are obtained by using the thus-determined three thresholds TH1 to TH3, are ranked again. Thus, the thresholds TH1 to TH3 are ranked to the third, first, and second ones, as shown in the ranking example (C) of FIG. 19. In this case, in the next object extracting processing, as shown in a ranking example (D) of FIG. 19, the thresholds TH1 to TH3 are determined to be the previous first-ranked threshold, the average of the previous first- and second-ranked thresholds, and the previous second-ranked threshold, respectively.

By iterating the ranking operations, the thresholds TH1 to TH3 are converged to be proper values so as to extract the object from the target frame. Thus, the object can be correctly extracted.

If there is the history information of the before-frame, the three thresholds TH1 to TH3 are determined based on the history and, thus, have substantially proper values to extract the object from the target frame. Consequently, the user can obtain the preferable result of extracting the object of the target frame by the operation of "designate rank" not so many times, alternatively, in the best case, by the operation of "designate rank" not at all time.

According to the embodiment, in FIGS. 18A to 19, when there is no history information, if the average of the V-component near the designated position is not less than 50, the three results of extracting the object is obtained from the boundary images of the three H-, S- and V-planes. The three results of extracting the object are ranked for their planes. In other words, the three results of extracting the object are obtained from the image of the first-ranked plane and the three boundary images formed based on the three thresholds TH1 to TH3. Thereafter, the three results of extracting the object can be ranked for threshold.

On the contrary, if the average of the V-component near the designated position when there is no history information, as mentioned above, on the rule of thumb, the three results of extracting the object are obtained based on the image of the V-plane and the three boundary images formed by using the three thresholds TH1 to TH3. After that, the three results of extracting the object can be ranked for threshold. In this case, the user needs no operation for ranking the planes and, corresponding thereto, the load of the user's operation can be reduced.

A description is given of the initial extracting processing in step S14 in FIG. 4.

In the initial extracting processing, the new target frame can be subjected to a plurality of (for example, in the embodiment, three) object extracting processing, not by user's operation of "designate position" for designating the position of the object but by using the history information and the result of extracting the object which are finally obtained from the before-frame. This result of extracting the object is displayed on the display unit 5.

Figure 20:
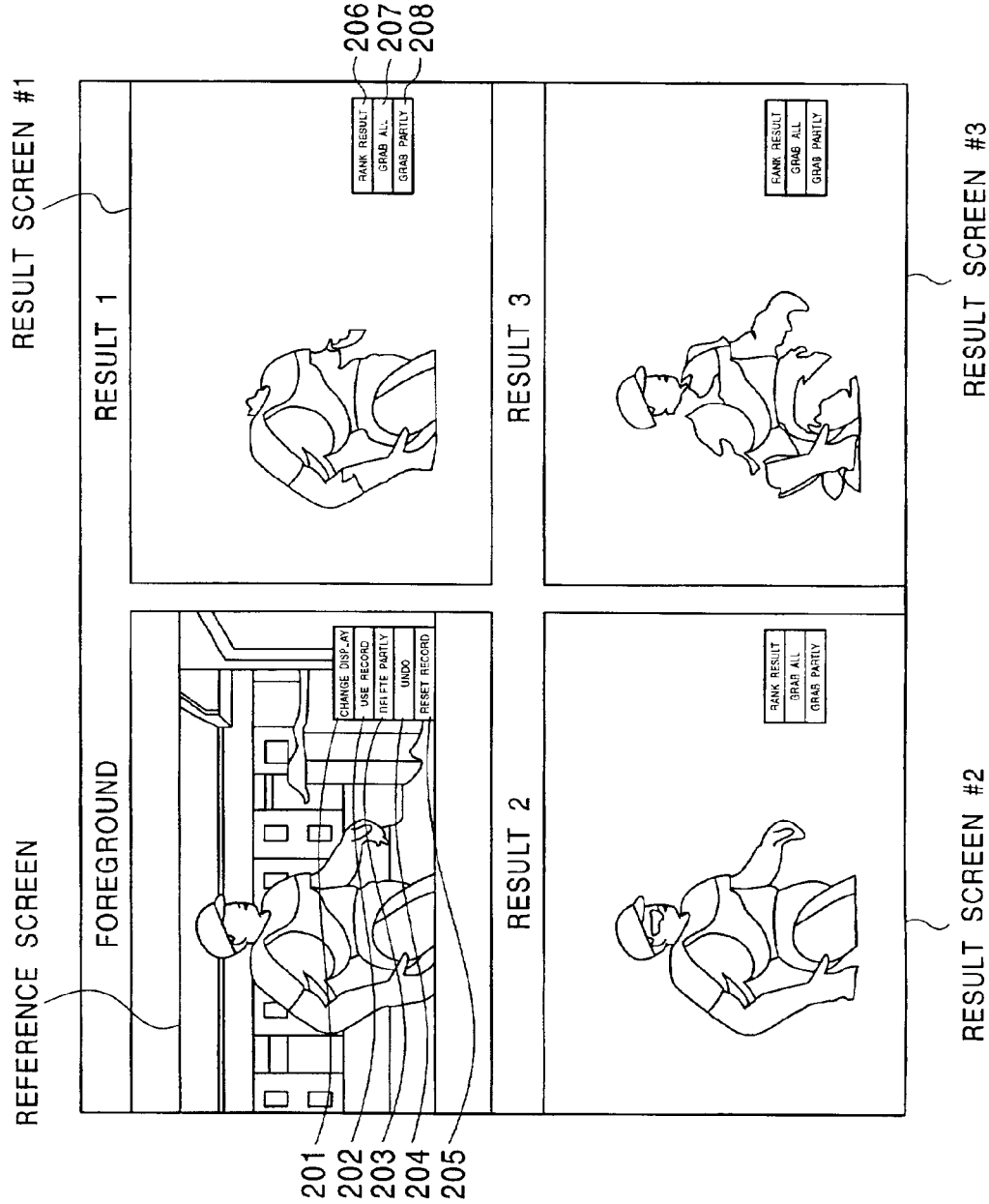
FIG. 20 is a diagram showing a display example of the screen of a display unit 5.

FIG. 20 shows display examples of the screen of the display unit 5 just after the initial extracting processing of the new target frame.

In the display examples of FIG. 20, a reference screen displays thereon the image of the new target frame (original image), and result screens #1 to #3 display thereon the three results of extracting the object in the three object extracting processing based on the history information and the result of extracting the object which are finally obtained from the before-frame, respectively.

In the display examples of FIG. 20, a reset record button 205 for erasing the history information of the before-frame which is stored in the history managing unit 4 is additionally displayed below the undo button 204. More specifically, the history information of the before-frame which is stored in the history managing unit 4 cannot be available by clicking the reset record button 205 through the mouse 9. However, the history information can be available by clicking the reset record button 205 again.

The object extracting unit 3 performs first to third initial extracting processing as follows, thus obtaining the results of extracting the object of the new target frame, which are displayed on the result screens #1 to #3.

Figure 21:
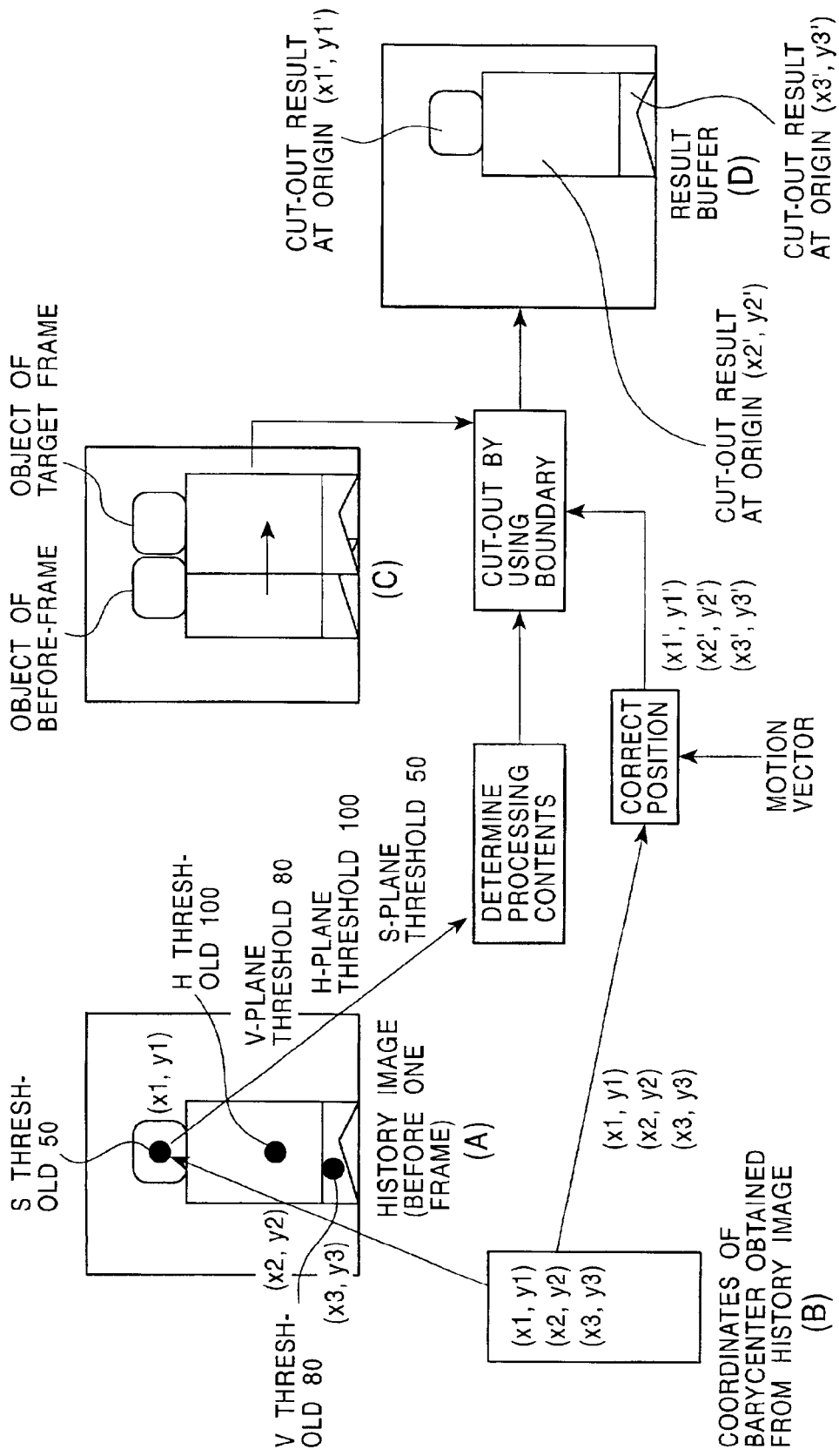
FIG. 21 is a diagram for explaining first initial extracting processing.

That is, it is assumed that a history image as shown in an image example (A) in FIG. 21 is obtained from the before-frame. The image example (A) in FIG. 21 shows the history image when a portion indicating a person is extracted from the before-frame indicating the whole body of the person. In the image example (A) in FIG. 21, the object is extracted as follows. That is, an area of the head of the person is extracted by using the S-plane image and the threshold 50 for binarization, an area of the body is extracted by using the H-plane image and the threshold 100 for binarization, and an area of the leg is extracted by using the V-plane image and the threshold 80 for binarization. Consequently, in the image example (A) in FIG. 21 showing the history image, all of the pixels comprising the areas of the head, the body, and the leg have a single ID.

In the first initial extracting processing, the processing control unit 7 obtains the barycenter of the area having a set of pixels of the single ID in the history image of the before-frame. Therefore, in the image example (A) in FIG. 21, the barycenters of the areas of the head, the body, and the leg are determined, respectively.

Coordinates at the barycenter of any desired area designate (X, Y) and the barycenter (X, Y) is determined by the following formulae.

$$X = \Sigma x_k / N$$

$$Y = \Sigma y_k / N$$

where: N=The number of pixels forming any desired area
$\Sigma$=Summation when a variable k varies from 1 to N
Coordinates of the k-th pixel forming any desired area designates $(x_k, y_k)$.

As shown in an image example (B) in FIG. 21, when barycenters (x1, y1), (x2, y2), and (x3, y3) of the areas of the head, the body, and the leg, the processing control unit 7 allows a motion vector $(v_x, v_y)$ of the target frame while using the barycenter (x1, y1), as the reference, of the before-frame. Further, the processing control unit 7 allows the position correcting section 71 stored therein to correct the designated position (x1, y1) of the before-frame by using the motion vector $(v_x, v_y)$, thus determining a position (x1', y1') on the target frame corresponding to the barycenter (x1, y1) of the before-frame. In other words, the position correcting section 71 determines the position (x1', y1') on the target frame corresponding to the barycenter (x1, y1) of the before-frame.

Thereafter, the processing control unit 7 obtains the ID as the pixel value at the barycenter (x1, y1) of the before-frame by referring to the history image of the before-frame which is stored in the history image storing section 42, and further obtains the parameter set corresponding to the ID by referring to the parameter table storing section 43. In addition, the processing control unit 7 determines that the three boundary images are formed based on the thus-obtained parameter set and the area at the position (x1', y1'), as the origin, on the target frame corresponding to the barycenter (x1, y1) of the before-frame is cut out from the three boundary images. The processing control unit 7 supplies the determined information to the object extracting unit 3.

The processing control unit 7 subjects the remaining the two barycenters (x2, y2) and (x3, y3), out of the barycenters (x1, y1), (x2, y2), and (x3, y3) shown in the image example (B) in FIG. 21, to the above-stated processing.

Accordingly, as shown in an image example (C) in FIG. 21, the object extracting unit 3 forms the boundary image of the target frame based on the parameter set corresponding to the determined information, and cuts out, from the boundary images, the areas at the positions (x1', y1'), (x2', y2'), and (x3', y3') on the target frame, corresponding to the barycenters (x1, y1), (x2, y2), and (x3, y3) of the before-frame, thus extracting the object. As shown in an image example (D) in FIG. 21, the results of extracting the object is stored in the result buffer 33A, and it is displayed on the result screen #1 as shown in FIG. 20.

In the second initial extracting processing, the object extracting unit 3 extracts the object out of the target frame by, for example, template matching.

Figure 22:
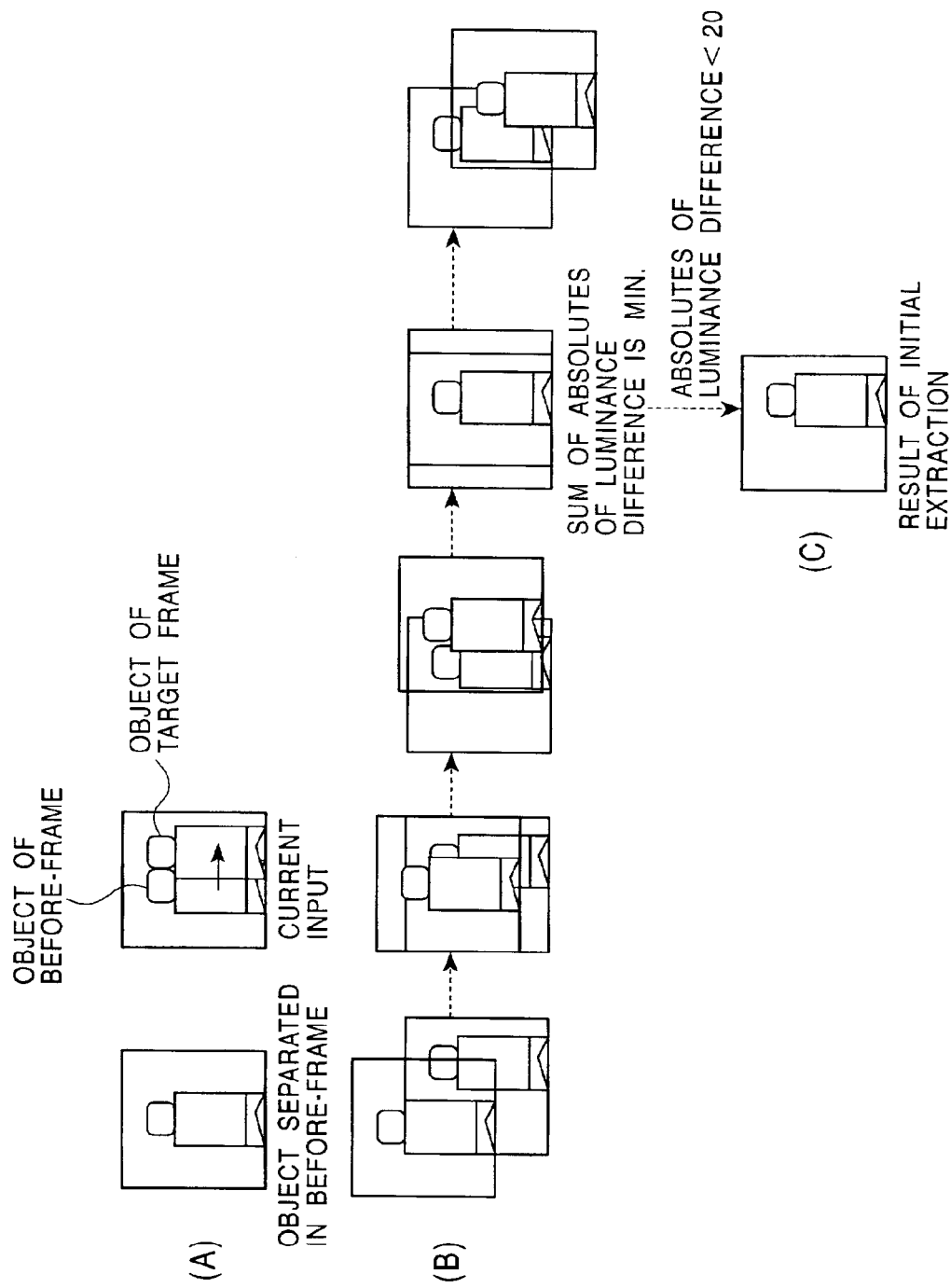
FIG. 22 is a diagram for explaining second initial extracting processing.

More specifically, the object extracting unit 3 reads the target frame and the final result of extracting the object of the before-frame, out of the storage 1 through the target frame processing unit 2. In an example (A) in FIG. 22, the object extracting unit 3 overlaps the target frame to the final result of extracting the object of the before-frame and, thereby, calculates the sum of differences of absolutes among the corresponding pixels (e.g., the luminance). In an example (B) in FIG. 22, the object extracting unit 3 obtains the sum of the differences of absolutes by varying the overlapped position of the target frame and the final result of extracting the object of the before-frame every pixel. Further, the object extracting unit 3 obtains the positional relationship between the target frame and the final result of extracting the object of the before-frame when the sum of the differences of the absolutes is minimum. In an example (C) in FIG. 22, the object extracting unit 3 detects, out of the target frame, that the pixel having the difference of the absolutes between the pixels values in the positional relationship is not greater than, e.g., 20, and it written the detected pixel value to the result buffer 33B as the result of extracting the object of the target frame. Accordingly, the result of extracting the object written to the result buffer 33B is displayed on the result screen #2 in FIG. 20.

In the third initial extracting processing, the object extracting unit 3, similarly to the case described in FIG. 16, extracts the object out of the target frame, writes the extracted result to the result buffer 33C, and displays it on the result screen #3 in FIG. 20.

The above first to third initial extracting processing is automatically executed after changing the target frame to the new frame without waiting for the input from the user. Consequently, the user's load of operations such as "designate position" and "designate rank" can be reduced.

If the user performs "grab all" or "grab partly" for any of the three results of extracting the object obtained in the above first to third initial extracting processing and thus all or a part of any of the three results of extracting the object is reflected to the object buffer 23 and is determined to be the final result of extracting the object of the target frame, there is not history information of the portion which is obtained in the initial extracting processing among the final result of extracting the object. When the next frame becomes the target frame, there is no history information of the before-frame, thus increasing the user's load of operations.

The history information of the before-frame can be succeeded to one of the next frame.

Figure 23:
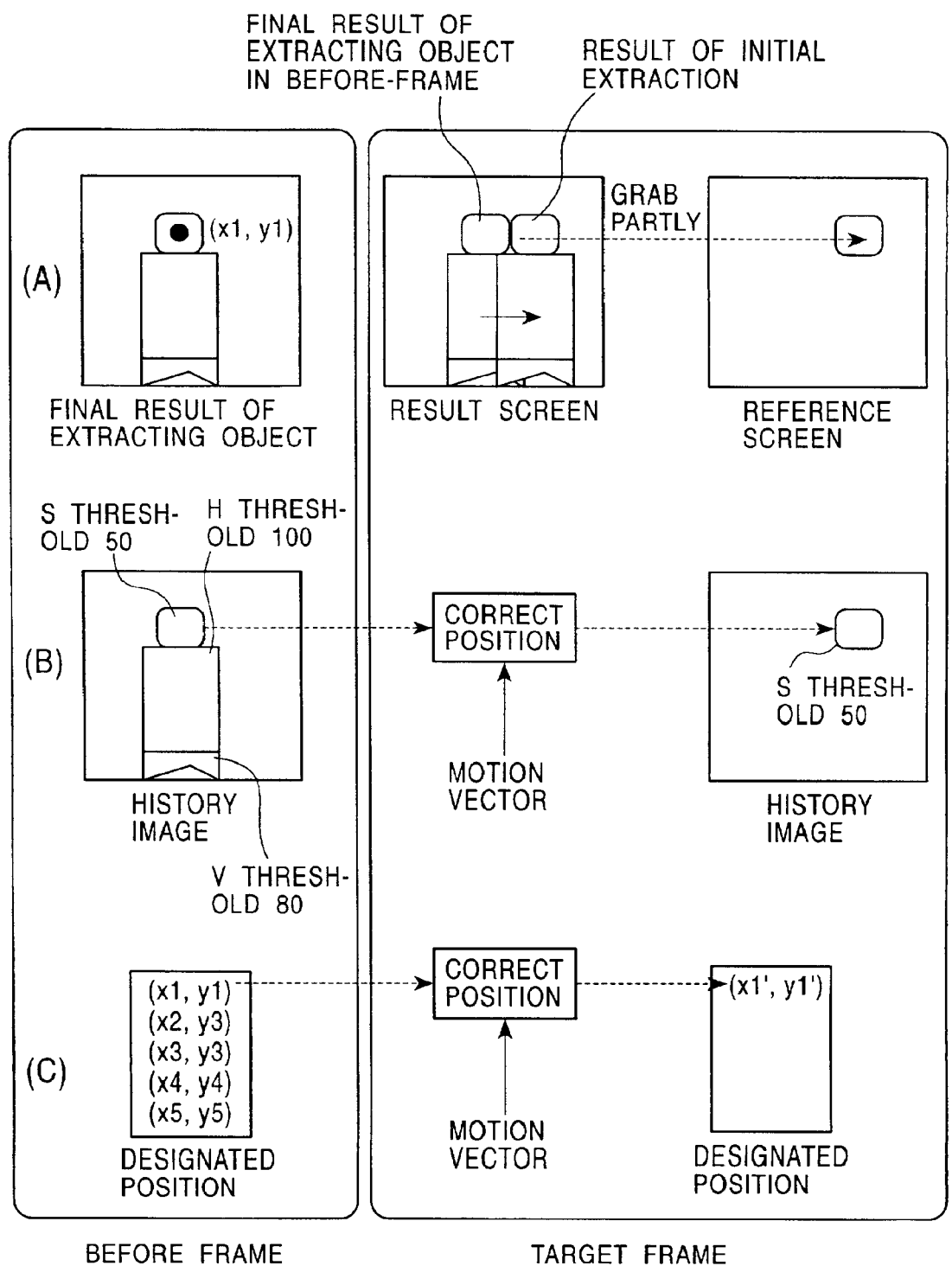
FIG. 23 is a diagram for explaining the succession of the history information.

In other words, in an image example (A) in FIG. 23, the final result of extracting the object is obtained from the before-frame and, then, the result of extracting the object of the target frame is displayed on the result screen through the initial extracting processing. A part of the result of extracting the object is reflected to the object buffer 23 by the user's operation of "grab partly".

In this case, the processing control unit 7 controls the motion detecting unit 6, thereby obtaining the motion vector of the part of the object reflected to the object buffer 23. In an image example (B) in FIG. 23, the motion vector causes the positional correction of the part corresponding to the area reflected to the object buffer 23, in the history image of the before-frame. Further, the processing control unit 7 controls the history managing unit 4, thereby copying the part of the history image after the positional correction as the history image of the target frame.

In addition, by referring to the designated position storing section 41, the processing control unit 7 determines whether or not the position, on the before-frame, designated by the user's click of the mouse 9 is included within the range of the history image, of the before-frame, copied as the history image of the target frame. If the position on the before-frame, designated by the user is included within the range, as shown in an image example (C) in FIG. 23, the designated position is corrected by using the motion vector described in the image example (B) in FIG. 23. The processing control unit 7 controls the history managing unit 4, thereby storing the coordinates of the designated position after the correction, as the coordinates of the designated position of the target frame, in the designated position storing section 41.

Only when the result of extracting the object obtained in the first and third initial extracting processing is reflected to the object buffer 23, of the first to third initial extracting processing, the above-described succession of the history information is performed. When the result of extracting the object obtained in the second initial extracting processing is reflected to the object buffer 23, the succession is not performed.

More specifically, in the first and third initial extracting processing, the object is extracted from the target frame based on the history information of the before-frame. As a consequence, in many cases, the reflection of the result of extracting the object to the object buffer 23 results in that even if the object of the target frame is extracted without the history information of the before-frame, the result of extracting the object obtained in the processing similar to that of the before-frame is the final result of extracting the object. Also, in many cases, the same history information as that of the before frame is formed.

On the contrary, in the second initial extracting processing, the object is extracted from the target frame by the template matching. Even if the result of extracting the object is reflected to the object buffer 23, the reflected object is extracted from the target frame irrespective of the history information of the before-frame. Therefore, when the object is extracted without the history information of the before-frame, the result of extracting the object obtained in the processing similar to that of the before-frame is not the final result of extracting the object. The same history information as that of the before-frame is not formed.

Accordingly, as mentioned above, only when the result of extracting the object obtained in the first and third initial extracting processing is reflected to the object buffer 23, the history information is succeeded. When the result of extracting the object obtained in the second initial extracting processing is reflected to the object buffer 23, the history information is not succeeded.

However, the history information can be succeeded even if any of the results of extracting the object obtained in the first to third initial extracting processing is reflected to the object buffer 23.

In an plurality of processing, a plurality of results of extracting the object are obtained, and a preferable result is selected from the obtained results by the user's determination and is reflected to the final result of extracting the object. Consequently, the object can be correctly with easy operation.

Further, when there is the history information of the before-frame, the object of the target frame is extracted based on the history information and the position on the target frame inputted by the user. The object can also be correctly extracted with easy operation.

That is, in the image processing apparatus in FIG. 2, the user designates any desired position on the object on the target frame and, then, the area on the target frame is cut out at the position as the origin (the object is extracted), and the three obtained results of extracting the object are displayed. Further, when necessary, user designates the rank of the three results of extracting the object, the areas on the target frame are cut out again in the three processing based on the rank, and the three obtained results of extracting the object are obtained. The user designates the proper one of the three results of extracting the object and, then, the designated result of extracting the object is reflected to the final result of the extracting the object. As a consequence, the user iterates the operations, with reduced load, such as designation of the position on the object, of the necessary rank, and of the proper result of extracting the object by necessary times, thus correctly extracting the object from the target frame.

Further, when the next frame becomes the target frame, by referring to the formed history information of the frame before one frame (before-frame), the parameter set for extracting, as the object, the pixel of the before-frame corresponding to the position, on the target frame, inputted by the user is recognized. The contents of the three object extracting processing are determined based on the parameter set. Therefore, only by the operations, with reduced load, such as the designation of the position on the object from the target frame, the user can preferably obtain the object from the target frame.

Although the user designates the position on the object from the target frame in the present embodiment, he can designate a part of the object from the target frame.

Although the object is extracted from the target frame based on the history information of only the before-frame in the present embodiment, the some pieces of history information by weighting and the object can be extracted from the target frame based on the weighted history information. Although the history information of the before-frame is used, as that for time-serially processing the frame, for extracting the object from the target frame, the history information of the following frames can be used for extracting the object from the target frame when the frames are processed in time-back.

Further, although the object is extracted from the frames of the moving pictures in the present embodiment, the object can be extracted from a still image according to the present invention.

According to the present invention, not only the foreground but also a part component of the background can be extracted.

The object extracting processing in the present embodiment is only one example and the application of the object extracting processing is not limited.

Further, the present invention can be applied to the variety of image processing apparatuses in a broadcasting system, a editing system, and the like.

What is claimed is:

1. An image processing apparatus comprising:
   event detecting means for detecting an event in accordance with a user's operation;
   boundary detecting means comprising separating means for separating a pixel value of a target image into a plurality of components and outputting component images, edge detecting means for detecting an edge of one component image outputted by said separating means and outputting an edge image, binarizing means for binarizing the edge image outputted by said edge detecting means and outputting the binarized image, and thin-line means for making the binarized image outputted by said binarizing means a thin-line image and outputting the thin-line image;
   extracting means for extracting a pixel corresponding to an object including a target pixel from the thin-line image, when the event detecting means detects the event at the position designated by the user's operation in a space direction of the target image, by setting, as the target pixel, a pixel of the thin-line image corresponding to the one component image at the position designated by the event, by storing a pixel value of the target pixel at the stored position corresponding to the position on the target pixel, by searching for a portion up to a thin-line area of the thin-line image in the space direction at the set target pixel as the origin, and by storing the pixel value searched at the stored position corresponding to the searched pixel position;
   a plurality of primary storing means for storing the pixel value corresponding to the object which is transferred by said extracting means;
   display means for displaying a plurality of screens corresponding to the plurality of primary storing means based on the pixel values of the pixels corresponding to the object stored in said extracting means; and
   object storing means for, when the event detecting means detects the event for selecting at least a part a the object displayed on said display means by the user's operation, transferring the pixel value of the pixel stored in said primary storing means corresponding to the selected part and storing the pixel value at the stored position corresponding to the position of the pixel.

2. An apparatus according to claim 1, further comprising:
   control means for, when the event detecting means detects the event for designating the rank of the plurality of screens displayed on said display means in accordance with the user's operation, transferring said one component corresponding to a first-ranked screen and a plurality of thresholds which are determined in advance for binarizing the pixel value of the pixel stored in said primary storing means, corresponding to the first-ranked screen,
   wherein in said boundary detecting means, said edge detecting means detects the edge of one component image corresponding to one component, which is transferred by said control means, and outputs the edge image,
   said binarizing means outputs a plurality of binarized images based on the plurality of thresholds transferred by said control means, and
   said thin-line means makes the binarized images outputted by said binarizing means make a thin-line image and outputs the thin-line image, and
   said extracting means extracts the pixel corresponding to the object including a target pixel from the thin-line image, by setting, as the target pixel, the pixel corresponding to the position designated by the event, by storing the pixel value of the target pixel at the stored position corresponding to the position of the target image, by searching for a portion up to a thin line area of the thin-line image in the space direction at the set target pixel as the origin, and by storing the pixel value of the pixel searched at the stored position corresponding to the position of the searched pixel.

3. An apparatus according to claim 2, wherein in said control means, when detecting the event for designating the rank corresponding the plurality of screens displayed on said display means in accordance with the user's operation, the event detecting means transfers, to said boundary detecting means, said one component which is selected in advance out of the plurality of components and a plurality of new thresholds having a first threshold as a first-ranked threshold, a second threshold as the average of the first-ranked threshold and the second-ranked threshold, and a third threshold as the second-ranked threshold, which are determined based on an n-th threshold corresponding to the thin-line image of the (n-th)-ranked screen, and in said boundary detecting means, said edge detecting means detects the edge of one component image corresponding to said one component which is transferred by said control means and outputs the edge image, said binarizing means outputs a plurality of binarized images based on the plurality of new thresholds which are transferred by said control means, and said thin-line means allows said binarized images outputted by said binarizing means to have thin lines and outputs the thin-line image.

4. An apparatus according to claim 1, further comprising:

designated position storing means for storing the position designated by the event;

history image storing means for storing an identifier associated with the threshold and the component corresponding to the pixel value of the pixel stored in said object storing means, in accordance with the operation for selecting a part of the object displayed on the plurality of screens by the user's operation;

table means for storing the identifier, the components, and the threshold with a corresponding relationship thereof; and control means for, when detecting the event for selecting at least one part of the object displayed on one screen out of the plurality of screens displayed on said display means, controlling the operation for transferring and storing the pixel value of the pixel stored in said primary storing means corresponding to the selected part at the stored position corresponding to the position of the pixel in said object storing means, and also controlling such an operation that said designated position storing means stores therein the position corresponding to at least one part of the object selected, said table means stores the components and the thresholds corresponding to at least one part of the selected object to have a corresponding relationship with the identifier, and said history image storing means stores therein the identifier, as the pixel value, at the position of the pixel in at least one part of the selected object.

5. An apparatus according to claim 4, further comprising:

motion detecting means for, when the event detecting means detects the event for designating the position of the target image in the space direction by the user's operation, detecting coordinates corresponding to the image at the designated position on the target image by detecting the motion at the designated position on the target image, between the target image and a before-image which is located temporally before the target image, and wherein said control means detects the identifier of said history image storing means at the corresponding coordinates, detects the thresholds and the components, in said table means, corresponding to the detected identifier, and transfers the thresholds and the components to said boundary detecting means, in said boundary detecting means, said edge detecting means detects the edge of the component image corresponding to the component transferred by said control means, and outputs the edge image, said binarizing means outputs the binarized image based on a plurality of thresholds which are generated based on the thresholds transferred by said control means, and said thin-line means makes the binarized image outputted by said binarizing means a thin line image and outputs the thin-line image, and said extracting means extracts the pixel corresponding to the object including the target pixel from the thin-line image, by setting the pixel at the position designated by the event as the target pixel, by storing the pixel value of the target pixel at the stored position corresponding to the target pixel, by searching for a portion up to a thin-line area of the thin-line image in the space direction at the set target pixel as the origin, and by storing the pixel value of the searched pixel at the stored position corresponding to the searched pixel position.

6. An apparatus according to claim 4, further comprising:

motion detecting means for detecting target coordinates in the target image corresponding to the coordinates by detecting the motion based on the position of coordinates stored in said designated position storing means corresponding to a before-image which is located temporally before the target image, between the before-image and the target image, wherein said control means detects the identifier of said history image storing means corresponding to the coordinates, also detects the components and the thresholds in said table means corresponding to the detected identifier, and transfers the components and the thresholds to said boundary detecting means, in said boundary detecting means, said edge detecting means detects the edge of the component image corresponding to the components transferred by said control means, and outputs the edge image, said binarizing means outputs the binarized image based on the thresholds transferred by said control means, and said thin-line means makes the binarized image outputted by said binarizing means a thin-line image and outputs the thin-line image, and said detecting means sets the pixel corresponding to the target coordinates to be the target pixel, stores the pixel value of the target pixel at the stored position corresponding to the position of the target pixel, searches for a portion up to a thin-line area of the thin-line image at the set target pixel as the origin, and stores the pixel value of the searched pixel in the space direction at the stored position corresponding to the position of the searched pixel, thereby extracting the pixel corresponding to the object including the target pixel from the thin-line image.

7. An apparatus according to claim 6, wherein said binarizing means in said boundary detecting means outputs the binarized image based on a plurality of thresholds generated from the thresholds transferred by said control means.

8. An apparatus according to claim 6, wherein in said control means, the event detecting means detects the event for selecting at least one part of the object displayed on said display means by the user's operation, and determines whether or not the pixel value of the pixel stored in said primary storing means corresponding to the selected part is transferred and stored at the stored position corresponding to the position of the pixel in said object storing means, said motion detecting means detects motion between the target image and the before-image corresponding to the pixel transferred and stored in said object storing means, based on the determination, and detects the coordinates of the image corresponding to the pixel, said control means detects the identifier of said history image storing means corresponding to the corresponding coordinates, compensates for motion of the detected identifier in accordance with the motion detected by said motion detecting means, and stores the compensated data as a history image corresponding to the target image of said history image storing means, and allows said motion detecting means to compensate for the motion of the coordinates included in an identifier area in said history image storing means corresponding to said corresponding coordinates, out of the coordinates corresponding to said image stored in said designated position storing means and said designated position storing means to store therein the compensated coordinates as designated position coordinates corresponding to the target image.

9. An apparatus according to claim 4, wherein when the history information of a before-image which is located temporally before the target image is not stored in said history image storing means, said control means outputs said predetermined components and thresholds to the boundary detecting means.

10. An apparatus according to claim 9, wherein when the history information of the before-image is not stored in said history image storing means, said control means determines whether or not the average of the pixel values, of a V-plane as a brightness component separated by said separating means in a target pixel corresponding to the position in the target image designated by the user's operation and the peripheral pixels of the target pixel, is less than 50, if the average of the pixel values of the V-plane is less than 50, said binarizing means in said boundary detecting means output a binarized image which is obtained by binarizing the V-plane by the predetermined three thresholds, and if the average of the pixel values of the V-plane is not less than 50, said separating means separates the image into an H-plane as a hue component, an S-plane as a saturation component, and the V-plane as the brightness component, said binarizing means binarizes the three planes by using the same predetermined thresholds and outputs the binarized image.

11. An apparatus according to claim 4, wherein said control means detects a barycenter from a set of pixels having identifiers corresponding to a before-image which is temporally before the target image, as the pixel values, which are stored in said history image storing means, every identifier, said apparatus further comprises:

motion detecting means for detecting target coordinates in the target image corresponding to the barycenter by detecting motion based on the barycenter, between the target image and the before-image, wherein control means detects the identifier of said history image storing means corresponding to the barycenter, also detects the thresholds and the components in said table means, corresponding to the detected identifier, and transfers the thresholds and the components to said boundary detecting means, in said boundary detecting means, said edge detecting means detects the edge of the component image, corresponding to the component, transferred by said control means, and outputs the edge image, said binarizing means outputs the binarized image based on the thresholds transferred by said control means, and said thin-line means makes the binarized image outputted by said binarizing means a thin-line image and outputs the thin-line image, and said extracting means extracts the pixel corresponding to the object including the target pixel from the thin-line image, by setting the pixel at the target coordinates as the target pixel, by storing the pixel value of the target pixel at the stored position corresponding to the target pixel, by searching for a portion up to a thin-line area of the thin-line image in the space direction at the set target pixel as the origin, and by storing the pixel value of the searched pixel at the stored position corresponding to the searched pixel position.

12. An apparatus according to claim 1, further comprising:

accumulating means for storing the pixel values of the pixels corresponding to the object extracted from the target image stored in said object storing means when detecting the event for determination in accordance with the user's operation, wherein said extracting means sets, to be a template, the pixel values of a plurality of pixels corresponding to the object stored in said accumulating means, which is extracted from a before-image which is temporally before the target image, performs template matching of the target image, and extracts the pixel corresponding to the object from the target image based on the position having the highest matching level.

13. An image processing apparatus comprising:

processing method determining means for determining a processing method for extracting an object from a target image;

object extracting means for extracting the object from the target image based on the processing method determined by said processing method determining means;

primary storing means for storing a pixel value of a pixel corresponding to the object transferred by said object extracting means;

display means for displaying a plurality of screens corresponding to a primary storing means based on the pixel values of the pixels corresponding to the object stored in said plurality of primary storing means;

object storing means for, when a user selects at least a part of the object displayed on said display means, transferring the pixel value of the pixel stored in said primary storing means corresponding to the selected part and storing the pixel value at the stored position corresponding to the position of the pixel;

designated position storing means for storing the position of the target image designated by the user in a space direction;

history image storing means for storing an identifier associated with a threshold and a component corresponding to the pixel values of the pixel stored in said object storing means, in accordance with the operation for selecting a part of the object displayed on the plurality of screens by the user;

table means for storing the identifier, the component, and the threshold with a corresponding relationship thereof; and control means for, when the user selects at least one part of the object displayed on one screen out of the plurality of screens displayed on said display means, controlling an operation for transferring and storing the pixel value of the pixel stored in said primary storing means corresponding to the selected part, at the stored position corresponding to the position of the pixel in said object storing means, and also controlling such an operation that said designated position storing means stores the position corresponding to at least a part of the object selected, said table means stores the component and the threshold corresponding to at least a part of the object selected to have a corresponding relationship with the identifier, and said history image storing means stores the identifier, as the pixel value, at the position of the pixel in at least one part of the object selected, wherein said processing method determining means determines the processing method for extracting the object in accordance with the threshold and the component, which are detected from said table means, based on the identifier which is stored in said history image storing means corresponding to the designated position of the target image designated by the user.

14. An apparatus according to claim 13, further comprising:

motion detecting means for, when the user designates the position of the target image in the space direction, detecting corresponding coordinates of a before-image, which is temporally before the target image, at the designated position of the target image by detecting motion at the designated position of the target image between the target image and the before-image, wherein said control means detects the identifier of said history image storing means corresponding to said corresponding coordinates, detects the threshold and the component in said table means corresponding to the identifier detected, and transfers the threshold and the component to said object extracting means, said object extracting means detects an edge of a component image corresponding to the component and outputs an edge image, outputs a binarized image of the edge image based on a plurality of thresholds generated from the thresholds, makes the binarized image a thin-line image and outputs the thin-line image, and extracts the pixel corresponding to the object including a target pixel from the thin-line image, by setting, as the target pixel, the pixel corresponding to the position designated by the user, by storing the pixel value of the target pixel at the stored position corresponding to the position of the target pixel, by searching for a portion up to a thin line area of the thin-line image in the space direction at the set target pixel as the origin, and by storing the pixel value of the searched pixel at the stored position corresponding to the position of the searched pixel.

15. An apparatus according to claim 13, further comprising:

motion detecting means for detecting target coordinates in the target image corresponding to the coordinates by detecting motion based on the position of the coordinates stored in said designated position storing means corresponding to a before-image which is temporally before the target image, between the target image and the before-image, wherein control means detects the identifier of said history image storing means corresponding to the coordinates, also detects the threshold and the component in said table means corresponding to the detected identifier, and transfers the threshold and the component to said object extracting means, said object extracting means detects an edge of a component image corresponding to the component, and outputs an edge image, outputs a binarized image based on the threshold, and makes the binarized image a thin-line image and outputs the thin-line image, and extracts the pixel corresponding to the object including the target pixel from the thin-line image, by setting the pixel at the target coordinates as the target pixel, by storing the pixel value of the target pixel at the stored position corresponding to the target pixel, by searching for a portion up to a thin-line area of the thin-line image in the space direction at the set target pixel as the origin, and by storing the pixel value of the searched pixel at the stored position corresponding to the searched pixel position.

16. An apparatus according to claim 15, wherein said object extracting means outputs the binarized image based on a plurality of thresholds generated from the thresholds transferred by said control means.

17. An apparatus according to claim 15, wherein when the user selects at least one part of the object displayed on said display means, said control means determines whether or not the pixel value of the pixel stored in said primary storing means corresponding to the selected part is transferred and stored at the stored position corresponding to the position of the pixel of said object storing means, said motion detecting means detects motion between the target image and the image before the target image corresponding to the pixel transferred and stored in said object storing means, based on the determination, and also detects the coordinates of the image corresponding to the pixel, said control means detects the identifier of said history image storing means corresponding to the corresponding coordinates, compensates for motion of the detected identifier in accordance with the motion detected by said motion detecting means, and stores the compensated data as the history image corresponding to the target image of said history image storing means, and controls such an operation that said motion detecting means compensates for the motion of the coordinates included in an identifier area in said history image storing means corresponding to the corresponding coordinates, out of the coordinates corresponding to the image stored in said designated position storing means and said designated position storing means stores therein the compensated data as the designated position coordinates corresponding to the target image.

18. An apparatus according to claim 13, wherein when history information corresponding to the image before the target image is not stored in said history image storing means, said control means outputs the predetermined threshold and component to said object extracting means.

19. An apparatus according to claim 18, wherein when the history information corresponding to the image before the target image is not stored in said history image storing means, said control means determines whether or not the average of the pixel values, of a V-plane as a brightness component of the target pixel corresponding to the position in the target image designated by the user and the peripheral pixels of the target pixel, is less than 50, if the average of the pixel values of the V-plane is less than 50, said control means controls such an operation that said object extracting means outputs the binarized image which is obtained by binarizing the V-plane by three predetermined thresholds, if the average of the pixel values of the V-plane is not less than 50, said control means controls such an operation that said object extracting means separates the pixels in the target image into an H-plane as a hue component, an S-plane as a saturation component, and the V-plane as the brightness component, the three H-, S-, and V-planes are binarized by using the same predetermined thresholds and the binarized image is outputted.

20. An apparatus according to claim 13, further comprising:

accumulating means for storing the pixel value of the pixel corresponding to the object extracted from the target image stored in said object storing means, when the user determines the operation, wherein said object extracting means sets, to be a template, the pixel values of a plurality of pixels corresponding to the object stored in said accumulating means, which is extracted from the image before the target image, performs template matching of the target image, and extracts the pixel corresponding to the object from the target image based on the position having the highest matching level.

21. An apparatus according to claim 13, wherein said control means detects a barycenter from a set of pixels having pixel values of identifiers of a before-image which is temporally before the target image, stored in said history image storing means, every identifier, said apparatus further comprises:

motion detecting means for detecting target coordinates in the target image corresponding to the barycenter by detecting motion based on the barycenter, between the target image and the before-image, said control means detects the identifier of said history image storing means corresponding to the barycenter, also detects the threshold and the component in said table means corresponding to the detected identifier, and transfers the threshold and the component to said object extracting means, said object extracting means detects an edge of a component image corresponding to the component, and outputs an edge image, outputs a binarized image based on the threshold, and makes the binarized image a thin-line image, and outputs the thin-line image, and extracts the pixel corresponding to the object including the target pixel from the thin-line image, by setting the pixel at the target coordinates as the target pixel, by storing the pixel value of the target pixel at the stored position corresponding to the target pixel position, by searching for a portion up to a thin-line area of the thin-line image in the space direction at the set target pixel as the origin, and by storing the pixel value of the searched pixel at the stored position corresponding to the searched pixel position.

22. An image processing apparatus comprising:

object extracting means for extracting an object from a target image through a plurality processing and outputting the result of extracting the object;

selecting means for selecting at least a part of the result of extracting the object through the plurality of processing in accordance with a user's operation; and object storing means for storing the result of extracting the object, which is selected by said selecting means; and determining means for determining a plurality of processing method by using said object extracting means;

wherein said object extracting means extracts the object from the target image through a plurality of processing, said determining means, wherein when the user designates a rank of the results of extracting the object through the plurality of processing, said determining means determines the plurality of processing methods based on the rank, and wherein said object extracting means separates pixels in the target image into a plurality of components, generates edge images corresponding to component images of the components, binarizes the edge images by using a predetermined threshold, and outputs the binarized images, and when the user designates rank for the binarized images, under the control of said determining means, said object extracting means binarizes the component image corresponding to the first-ranked binarized image by using the predetermined threshold and outputs a plurality of binarized images.

23. An apparatus according to claim 22, wherein when the user designates the rank for the plurality of binarized images by using the predetermined threshold, under the control of said determining means, said object extracting means binarizes the component image by using a first threshold of the first-ranked binarized image, a second threshold as the average of the thresholds of the first-ranked binarized image and a second-ranked binarized image, and a third threshold as the second-ranked threshold, and outputs a plurality of binarized images.

24. An image processing apparatus comprising:

selecting means for selecting at least a part of the result of extracting the object through the plurality of processing in accordance with a users operation;

object storing means for storing the result of extracting the object, which is selected by said selecting means;

determining means for determining a plurality of processing methods by using said object extracting means, processing history storing means for storing a processing history as a processing method corresponding to the result of extracting the object, when the result of extracting the object selected by said selecting means is stored in said object storing means; and object extracting means for extracting an object from a target image through a plurality processing and outputting the result of extracting the object wherein said determining means determines a plurality of processing methods for extracting the object from the target image based on the processing history of a before-image stored in said processing history storing means, which is processed before the target image;

wherein said object extracting means extracts the object from the target image through a plurality of processing determined by said determining means, and wherein said object extracting means separates the pixels in the target image into a plurality of components, generates edge images in component images of components, binarizes the edge images by using a predetermined threshold and outputs the binarized image, and outputs the result of extracting the object every binarized image, said processing history storing means comprises;

designated position storing means for storing the designated position of the target image designated by the user;

history image storing means for storing, as a pixel value, an identifier associated with the threshold and the component corresponding to at least a part of the object selected by said selecting means; and table means for storing therein the identifier, the component, and the threshold with a corresponding relationship thereof, said apparatus further comprises motion detecting means for detecting corresponding coordinates of the before-image at the designated position by motion detection at the designated position to the target image, between the target image and the before-image, and, said object extracting means detects the identifier of said history image storing means corresponding to the corresponding coordinates, and also detects the threshold and the component in said table means, corresponding to the identifier detected, generates the edge image in the component image of the component, outputs the edge image, as the binarized image, based on a plurality of thresholds generated from the threshold, and outputs the result of extracting the object every binarized image.

25. An image processing apparatus comprising:

determining means for determining a processing method for extracting an object from a target image in accordance with at least of a user's operation, processing history storing means for storing a processing history as a history of processing method determined by said determining means; and object extracting means for extracting the object from a target image based on the processing method determined by said determining means, wherein said determining means determines the processing method for extracting the object from the target image based on the processing history stored in said processing history storing means, wherein said determining means determines the processing method for extracting the object from the target image based on the designated position in the target image designated by the user, and wherein said determining means determines a plurality of processing methods for extracting the object from the target image based on the designated position, of a before-image stored in said designated position storing means, which is processed before the target image;

wherein said processing history storing means comprises designated position storing means for storing the position in the target image, which is designated by the user; and wherein said object extracting means separates pixels in the target image into a plurality of components, generates edge images corresponding to component images of the components, binarizes the edge images by using a predetermined threshold, and outputs the binarized image, and outputs the object every binarized image, and said processing history storing means comprises:

the designated position storing means;

history image storing means for storing, as a pixel value, an identifier associated with the component and the threshold corresponding to the object extracted by said object extracting means; and table means for storing the identifier, the component, and the threshold with a corresponding relationship thereof.

26. An apparatus according to claim 25, wherein said apparatus further comprises motion detecting means for detecting target coordinates of the before-image corresponding to the designated position by detecting motion at the designated position of the target image, between the target image and the before-image, under the control of said determining means, said object extracting means detects the identifier of said history image storing means at the corresponding coordinates, and also detects the threshold and the component in said table means, corresponding to the identifier detected, generates the edge image in the component image of the component, outputs the edge image, as the binarized image, based on a plurality of thresholds generated from the threshold, and outputs the result of extracting the object every binarized image.

27. An apparatus according to claim 25, wherein said apparatus further comprises motion detecting means for detecting target coordinates in the target image corresponding to the coordinates by motion detecting based on the coordinate position of the before-image, which is stored in said designated position storing means, between the target image and the before-image, under the control of said determining means, said extracting means detects the identifier of said history image storing means at the coordinates, and also detects the component and the threshold in said table means, corresponding to the detected identifier, detects an edge of a component image corresponding to the component, and generates an edge image, outputs the edge image, as a binarized image, based on the threshold, and extracts the object from the binarized image.

28. An apparatus according to claim 27, wherein said binarizing means outputs the binarized image based on a plurality of thresholds generated from the thresholds.

29. An image processing apparatus comprising:

determining means for determining a processing method for extracting an object from a target image in accordance with at least of a user's operation, processing history storing means for storing a processing history as a history of the processing method determined by said determining means;

object extracting means for extracting the object from a target image based on the processing method determined by said determining means;

wherein said determining means determines the processing method for extracting the object from the target image based on the processing history stored in said processing history storing means, and wherein said determining means determines the processing method for extracting the object from the target image based on the designated position in the target image designated by the user;

object storing means for storing the pixel value of the pixel corresponding to the object extracted by said object extracting means; and control means for, when storing, in said object storing means, the pixel value of the pixel corresponding to the object at the position of the target image designated by the user, controlling such an operation that said designated position storing means stores the designated position, said history image storing means stores, as the pixel value, the identifier associated with the component and the threshold when extracting the object at the designated position, and said table means stores the identifier, the component, and the threshold with a corresponding relationship thereof.

* * * * *